(12) United States Patent
Takebe et al.

(10) Patent No.: US 11,059,261 B2
(45) Date of Patent: Jul. 13, 2021

(54) SANDWICH LAMINATE, SANDWICH STRUCTURE AND UNIFIED MOLDED PRODUCT USING SAME AND PROCESSES FOR PRODUCING BOTH

(71) Applicant: Toray Industries, Inc., Tokyo (JP)

(72) Inventors: Yoshiki Takebe, Iyo-gun (JP); Hiroki Kihara, Nagoya (JP); Noriyuki Hirano, Iyo-gun (JP)

(73) Assignee: Toray Industries, Inc., Tokyo (JP)

( * ) Notice: Subject to any disclaimer, the term of this patent is extended or adjusted under 35 U.S.C. 154(b) by 905 days.

(21) Appl. No.: 14/781,174

(22) PCT Filed: Mar. 19, 2014

(86) PCT No.: PCT/JP2014/057441
§ 371 (c)(1),
(2) Date: Sep. 29, 2015

(87) PCT Pub. No.: WO2014/162873
PCT Pub. Date: Oct. 9, 2014

(65) Prior Publication Data
US 2016/0303824 A1    Oct. 20, 2016

(30) Foreign Application Priority Data
Apr. 2, 2013 (JP) ............................. JP2013-076637

(51) Int. Cl.
*B32B 5/26* (2006.01)
*B32B 27/32* (2006.01)
(Continued)

(52) U.S. Cl.
CPC ................ *B32B 5/26* (2013.01); *B32B 27/32* (2013.01); *B32B 37/06* (2013.01); *B32B 37/10* (2013.01);
(Continued)

(58) Field of Classification Search
CPC ....... B32B 5/26; B32B 37/10; B32B 2250/40; B32B 37/06; B32B 27/32
See application file for complete search history.

(56) References Cited

U.S. PATENT DOCUMENTS 5,560,985 A * 10/1996 Watanabe ............ A43B 23/086
                                                    442/245
5,854,149 A    12/1998 Nagayama et al.
(Continued)

FOREIGN PATENT DOCUMENTS

DE    19520477    12/1996
FR    2638120    4/1990
(Continued)

OTHER PUBLICATIONS

English translation of the Written Opinion dated Jun. 3, 2014 from PCT/JP2014/057441.

*Primary Examiner* — Samir Shah
*Assistant Examiner* — Tong Guo
(74) *Attorney, Agent, or Firm* — DLA Piper LLP (US)

(57) ABSTRACT

A sandwich laminate, includes as a layer forming a core, a sheet-form intermediate substrate obtained by impregnating a mat composed of reinforcement fibers with a thermoplastic resin; and, as layers forming a skin, sheet-form intermediate substrates obtained by impregnating a mat composed of reinforcement fibers or continuous reinforcement fibers with a thermoplastic resin, wherein at least the sheet-form intermediate substrate used as the layer forming a core has a thermal expansibility, the usable temperature region of a thermoplastic resin (A) constituting the layers forming a skin and that of a thermoplastic resin (B) constituting the layer forming a core overlap each other over a temperature range of at least 5° C., and the thermoplastic resin (A) has a temperature region where it does not melt at a lower limit (Continued)

of the usable temperature region of the thermoplastic resin (B).

8 Claims, 5 Drawing Sheets

(51) Int. Cl.
    *B32B 37/06*      (2006.01)
    *B32B 37/10*      (2006.01)
(52) U.S. Cl.
    CPC ..... *B32B 2250/40* (2013.01); *B32B 2260/023* (2013.01); *B32B 2260/046* (2013.01); *B32B 2307/538* (2013.01); *B32B 2605/003* (2013.01)

(56) References Cited

U.S. PATENT DOCUMENTS

| | | | |
|---|---|---|---|
| 5,882,564 A * | 3/1999 | Puppin | B27N 3/28 264/101 |
| 7,092,544 B2 | 8/2006 | Hachiya et al. | |
| 2005/0003721 A1 | 1/2005 | Greulich et al. | |
| 2006/0062935 A1 * | 3/2006 | Murakami | C08J 5/18 428/1.31 |
| 2009/0065105 A1 | 3/2009 | Kochi et al. | |
| 2009/0208721 A1 * | 8/2009 | Tsuchiya | B29C 45/14786 428/220 |
| 2010/0215887 A1 * | 8/2010 | Kawabe | B29C 43/20 428/56 |
| 2012/0121885 A1 * | 5/2012 | Klethi | B32B 5/16 428/297.4 |
| 2014/0030491 A1 * | 1/2014 | Sakai | B29C 70/086 428/172 |

FOREIGN PATENT DOCUMENTS

| | | |
|---|---|---|
| JP | 4-334441 | 11/1992 |
| JP | 6-072282 | 3/1994 |
| JP | 6-320655 | 11/1994 |
| JP | 08-176737 | 7/1996 |
| JP | 8-224793 | 9/1996 |
| JP | H08224793 * | 9/1996 |
| JP | 9-109307 | 4/1997 |
| JP | 2002-369286 | 12/2002 |
| JP | 2003-105496 | 4/2003 |
| JP | 2003-268453 | 9/2003 |
| JP | 2007-502733 | 2/2007 |
| JP | 2009-068030 | 4/2009 |
| JP | 2010-253937 | 11/2010 |
| WO | 2012/101192 | 8/2012 |
| WO | WO2012101192 * | 8/2012 |
| WO | WO2012101192 * | 9/2012 |

* cited by examiner

Figure 3A
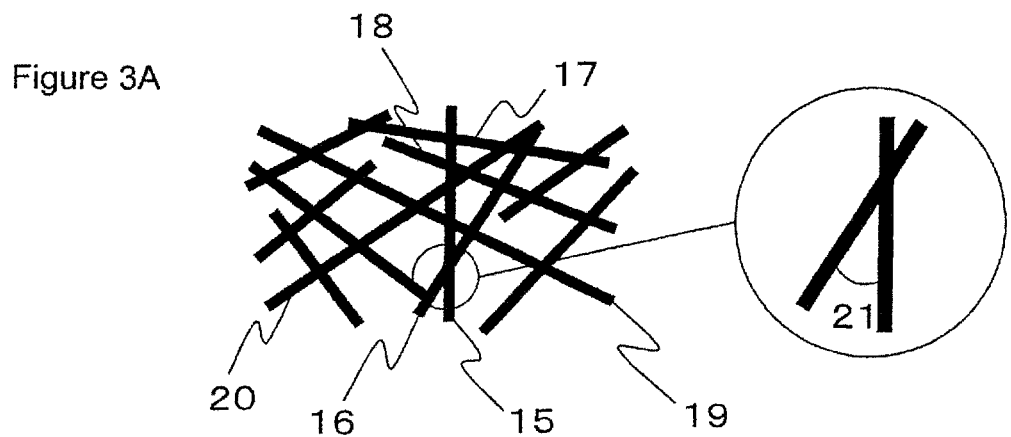
Figure 3B
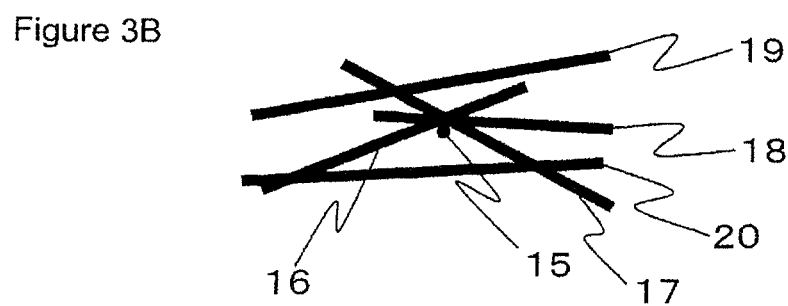
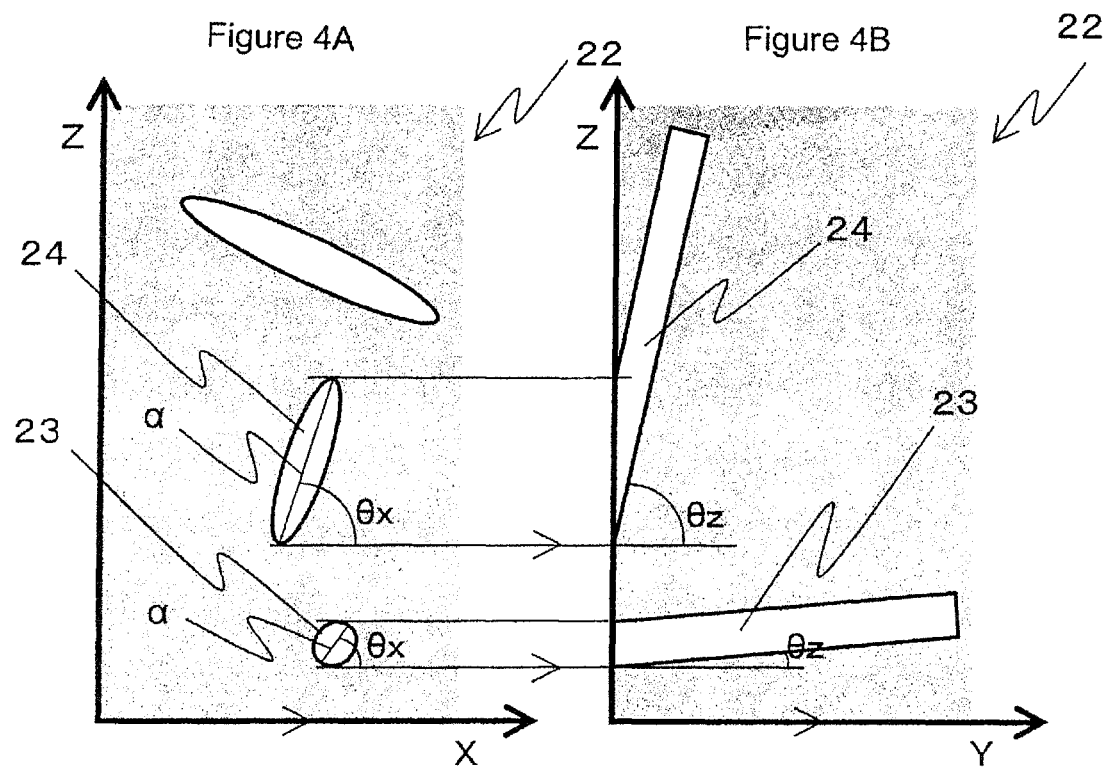
Figure 4A
Figure 4B

SANDWICH LAMINATE, SANDWICH STRUCTURE AND UNIFIED MOLDED PRODUCT USING SAME AND PROCESSES FOR PRODUCING BOTH

TECHNICAL FIELD

This disclosure relates to a sandwich laminate and a sandwich structure, which comprise sheet-form intermediate substrates each obtained by impregnating a mat composed of reinforcement fibers with a thermoplastic resin. The disclosure also relates to: a sandwich structure and an integrally molded article, which show excellent productivity, light-weight properties and bondability between a skin layer and a core layer; and production methods thereof.

BACKGROUND

Fiber-reinforced plastics (FRPs) composed of reinforcement fibers and a matrix resin have excellent light-weight properties and dynamic properties and are thus widely utilized in various industrial applications. Thereamong, FRPs (CFRTPs) comprising a thermoplastic resin have recently been drawing attention because not only do they have the above-mentioned light-weight properties and dynamic properties, but they also can be mass-produced by high-speed molding unique to thermoplastic resins and matrix resins of the same kind can be bonded or adhered by remelting. Under such market conditions, the market often demands those parts and structures comprising a CFRTP to have, in particular, light-weight properties and good productivity. Accordingly, there have been a number of proposals pertaining to the means of achieving weight reduction with the use of a low-density thermoplastic resin for a core layer in a laminate having a sandwich structure and thereby reducing the specific gravity of the resulting product as a whole as well as the technologies that provide lightweightness by arranging voids inside a sandwich-form structure and thereby reducing the density of the resulting product as a whole. At the same time, the technologies that provide a sandwich structure in which a skin layer is adhered or bonded to a core layer comprising such voids have also been actively examined.

In a structure comprising such voids, the voids provided for weight reduction purpose have uneven surfaces and this may cause problems that, in a skin layer, the strength of the surface portion is reduced and designability cannot be ensured. As a technology developed in view of such problems, there is disclosed a method of improving the surface appearance of a molded article by laminating or arranging an inorganic filler-containing sheet on the surface of a fiber-reinforced thermoplastic resin molded article that contains voids in a specific range (Japanese Patent Application Laid-Open Publication (JP-A) No. H4-232047). However, in this technology, since the inorganic filler-containing sheet and the sheet serving as a core layer are different in terms of linear expansion coefficient and molding shrinkage associated therewith, in principle, resins having the same or similar linear expansion coefficients must be selected for the core layer and the inorganic filler-containing sheet. Therefore, the applicable range of the resulting article having good outer appearance is narrow and the inorganic filler-containing sheet is required to be prepared separately and then laminated or arranged on the core layer so that there may be a problem of poor productivity. Meanwhile, there is also disclosed a technology of adhering or bonding a skin layer to a composite sheet (core layer) which contains voids and is composed of reinforcement fibers and a thermoplastic resin by utilizing the surface unevenness based on the voids and an adhesive (Japanese Translated PCT Patent Application Laid-Open No. 2010-538863). As in this technology, in a bonding method where an adhesive is used to bond a skin layer and a core layer, there may be problems in that an adhesive-coating step is necessary and that, since the limit of the bonding strength depends on the strength of the adhesive, the bonded parts cannot provide satisfactory reliability.

It could therefore be helpful to provide a sandwich laminate in which, even when thermoplastic resins that are not compatible with each other are selected and used for skin layers and a core layer, these layers can be strongly bonded and easily integrated with each other. It could also be helpful to provide a sandwich laminate suitable to obtain the below-described sandwich structure, and provide a sandwich structure and an integrally molded article, which exhibit strong bond between skin layers and a core layer regardless of the types of the thermoplastic resins constituting the respective layers and have satisfactory light-weight properties.

SUMMARY

We thus provide:

A sandwich laminate, comprising, as layers forming a skin and a layer to form a core, sheet-form intermediate substrates each obtained by impregnating a mat composed of reinforcement fibers with a thermoplastic resin, wherein at least the sheet-form intermediate substrate used as the layer forming a core has a thermal expansibility, the usable temperature region of a thermoplastic resin (A) constituting the layers forming a skin and that of a thermoplastic resin (B) constituting the layer forming a core overlap each other over a temperature range of at least 5° C., and the thermoplastic resin (A) has a temperature region where it does not melt at a lower limit of the usable temperature region of the thermoplastic resin (B).

A sandwich laminate, comprising: as a layer to form a core, a sheet-form intermediate substrate obtained by impregnating a mat composed of reinforcement fibers with a thermoplastic resin (B); and, as layers forming a skin, sheet-form intermediate substrates each obtained by impregnating continuous reinforcement fibers with a thermoplastic resin (A), wherein at least the sheet-form intermediate substrate used as the layer forming a core has a thermal expansibility, the usable temperature region of the thermoplastic resin (A) constituting the layers forming a skin and that of the thermoplastic resin (B) constituting the layer forming a core overlap each other over a temperature range of at least 5° C., and the thermoplastic resin (A) has a temperature region where it does not melt at a lower limit of the usable temperature region of the thermoplastic resin (B).

A sandwich structure, comprising, as skin layers and a core layer, sheet-form intermediate substrates each obtained by impregnating a mat composed of reinforcement fibers with a thermoplastic resin, wherein a thermoplastic resin (A) constituting the skin layers and a thermoplastic resin (B) constituting the core layer form interface layers with a concave-convex shape having a maximum height Ry of not less than 50 μm and an average roughness Rz of not less than 30 μm, and the core layer forms a structure comprising the reinforcement fibers coated with the thermoplastic resin (B) as a support, continuous voids being formed in the structure.

A sandwich structure, comprising: as a core layer, a sheet-form intermediate substrate obtained by impregnating a mat composed of reinforcement fibers with a thermosplastic resin; and, as skin layers, sheet-form intermediate substrates each obtained by impregnating continuous reinforcement fiber(s) with a thermoplastic resin, wherein a thermoplastic resin (A) constituting the skin layers and a thermoplastic resin (B) constituting the core layer form interface layers with a concave-convex shape having a maximum height Ry of not less than 50 μm and an average roughness Rz of not less than 30 μm, and the core layer forms a structure comprising the reinforcement fibers coated with the thermoplastic resin (B) as a support, continuous voids being formed in the structure.

A sandwich structure, comprising: as a core layer, a sheet-form intermediate substrate obtained by impregnating a mat composed of reinforcement fibers with a thermosplastic resin; and, as skin layers, sheet-form intermediate substrates each obtained by impregnating continuous reinforcement fiber(s) with a thermoplastic resin, wherein a thermoplastic resin (A) constituting the skin layers and a thermoplastic resin (B) constituting the core layer form interface layers with a concave-convex shape having a maximum height Ry of not less than 50 μm and an average roughness Rz of not less than 30 μm, and the core layer forms a structure comprising the reinforcement fibers coated with the thermoplastic resin (B) as a support, continuous voids being formed in the structure.

A method of producing a sandwich structure, the method comprising heating any of the above-described sandwich laminates to allow the layer for forming a core to expand at a prescribed expansion ratio.

A method of producing any of the above-described sandwich structure, the method comprising at least the following steps [1] and [2]:

step [1]: the step of applying pressure in a condition where the thermoplastic resin (A) and the thermoplastic resin (B) are heated to at least a temperature at which the thermoplastic resin (A) and the thermoplastic resin (B) are each melted or soften, to impregnate the mat composed of the reinforcement fibers or the continuous reinforcement fiber(s) with the thermoplastic resin (A) to form layers for forming a skin, and to impregnate the mat composed of the reinforcement fibers with the thermoplastic resin (B) to form a layer for forming a core; and step [2]: the step of subsequently adjusting the thicknesses of the layers for forming a skin and the layer for forming a core with heating to allow the layer for forming a core to expand.

An integrally molded article, obtained by bonding a first member with a second member, the first member being any of the above-described sandwich structures or a sandwich structure produced by any of the above-described production methods and the second member being composed of other molded body.

A method of producing the above-described integrally molded article, the method comprising bonding the second member which is a molded body obtained by injection molding, with the first member by insert injection molding or outsert injection molding.

A method of producing any of the above-described integrally molded articles, the method comprising bonding the second member which is a molded body obtained by press molding, with the first member by press molding.

According to the sandwich laminate, even when a combination of thermoplastic resins exhibiting poor adhesion with each other is used for the layers forming a skin and the layer forming a core, a sandwich laminate with excellent bondability can be obtained with high productivity. In addition, this sandwich laminate can be suitably used to obtain the sandwich structure. Further, according to the sandwich structure, since the light-weight properties are satisfied and the skin layers and the core layer are strongly bonded because of a concave-convex structure, a sandwich structure in which different thermoplastic resins are strongly bonded with each other can be obtained without using any bonding medium such as an adhesive. Moreover, in an integrally molded article comprising this sandwich structure, by imparting thereto functions based on various resin properties, an integrally molded article having high added value can be obtained. Furthermore, the above-described sandwich structure and integrally molded article have high productivity attributed to the use of thermoplastic resins. Because of the above-described effects, the integrally molded article is suitably used as a mounting member in such applications as automobile members, electric/electronic device housings and aircraft members.

BRIEF DESCRIPTION OF THE DRAWINGS

FIGS. 3A and 3B provide schematic views showing one example of the dispersion state of reinforcement fibers in a mat composed of the reinforcement fibers that is used.

FIGS. 4A and 4B provide schematic views showing one example of the cross-section of the sandwich laminate in the planar direction and the thickness direction.

Figure 1:
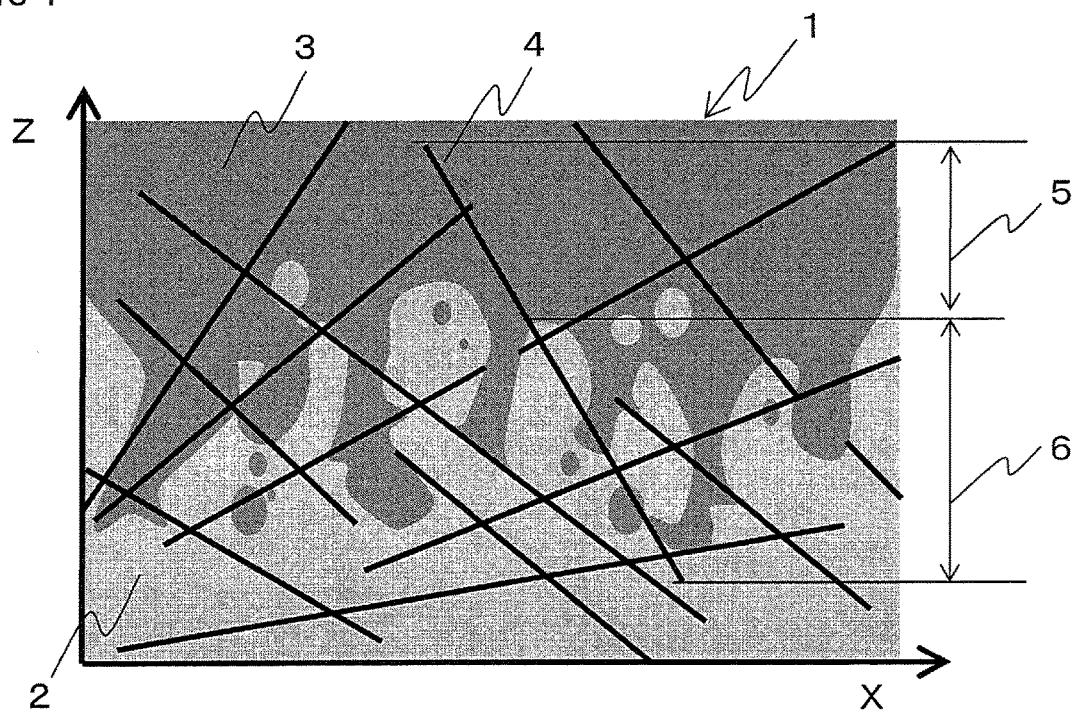
FIG. 1 is a schematic view showing one example of an interface layer of the sandwich laminate.

DESCRIPTION OF SYMBOLS 1, 7, 22: sandwich laminate
2, 9: thermoplastic resin (B)
3, 8: thermoplastic resin (A)
4, 15, 16, 17, 18, 19, 20, 23, 24: reinforcement fiber (single filament)
5: reinforcement fiber penetrating through thermoplastic resin (A)
6: reinforcement fiber penetrating through thermoplastic resin (B)

10: interface layer of sandwich laminate and sandwich structure
11: the deepest concave portion in interface layer
12: the most protruded convex portion in interface layer
13: the shallowest concave portion in interface layer
14: the least protruded convex portion in interface layer
21: two-dimensional contact angle, two-dimensional orientation angle
25, 37: specimen for tensile-shearing bonding test
29, 32, 35: sandwich structure
26, 38, 39: notch
27: skin layer
28: core layer
30: void
31, 34: integrally molded article
33, 36: second member
101: layer for forming a skin (or skin layer)
102: layer for forming a core (or core layer)

DETAILED DESCRIPTION

Sheet-form intermediate substrates each comprising a mat composed of reinforcement fibers (hereinafter, also referred to as "fiber-reinforced mat") are used. The term "fiber-reinforced mat" used herein refers to a planar body constituted of reinforcement fibers and may also contain a powder-form or fiber-form resin component in addition to the reinforcement fibers. Such a fiber-reinforced mat functions as an impregnation medium to form interface layers in which a thermoplastic resin and a thermoplastic resin (B) are anchored with each other.

From the standpoint of the easiness of impregnating the fiber-reinforced mat with a thermoplastic resin as well as the standpoint of further improving the effect of anchoring a thermoplastic resin by the fiber-reinforced mat to attain excellent bondability, it is preferred that the fiber-reinforced mat assume a nonwoven fabric form. Further, by allowing the fiber-reinforced mat to be in a nonwoven fabric form, the fiber-reinforced mat can be easily impregnated with a thermoplastic resin generally considered to have a high viscosity. The term "nonwoven fabric form" used herein refers to a form in which strands and/or monofilaments of reinforcement fibers are irregularly and planarly dispersed, and examples thereof include a chopped strand mat, a continuous strand mat, a paper-making mat, a carding mat and an air-laid mat.

A first sandwich laminate comprises, as layers forming a skin and a layer forming a core, sheet-form intermediate substrates each obtained by impregnating a fiber-reinforced mat with a thermoplastic resin.

Further, a second sandwich laminate comprises: as a layer forming a core, a sheet-form intermediate substrate obtained by impregnating a fiber-reinforced mat with a thermoplastic resin; and, as layers forming a skin, sheet-form intermediate substrates each obtained by impregnating continuous reinforcement fiber(s) with a thermoplastic resin.

The term "continuous reinforcement fiber" used herein refers to a fiber that is continuous at a length of 100 mm or more in at least one direction, and an aggregate of a plurality of such fibers arranged in one direction, which is so-called "reinforcement fiber bundle," is continuous over the full length of the sandwich laminate. Examples of the mode of the sheet-form intermediate substrate composed of such continuous reinforcement fibers include a woven fabric constituted by reinforcement fiber bundles composed of a plurality of continuous reinforcement fibers; a reinforcement fiber bundle in which a plurality of continuous reinforcement fibers are unidirectionally arranged (unidirectional fiber bundle); and a unidirectional woven fabric constituted by such unidirectional fiber bundles. A reinforcement fiber may be constituted of a plurality of fiber bundles of the same form or a plurality of fiber bundles of different forms. The number of reinforcement fibers constituting a single reinforcement fiber bundle is usually 300 to 48,000. However, taking into consideration the production of a prepreg and the production of a woven fabric, it is preferably 300 to 24,000, more preferably 1,000 to 12,000.

Further, to control the dynamic properties, a mode in which reinforcement fibers are laminated in different directions is preferably employed. In particular, to efficiently improve the elastic modulus and strength of the sandwich laminate, it is preferred to use continuous reinforcement fibers whose fiber bundles are parallelly aligned in a single direction (hereinafter, referred to as "UD").

The usable temperature region of a thermoplastic resin (A) constituting layers for forming a skin (TA1 to TA2) and that of a thermoplastic resin (B) constituting a layer for forming a core (TB1 to TB2) overlap each other over a temperature range of at least 5° C. A sandwich laminate satisfying this condition can be produced under a single temperature condition. In addition, this sandwich laminate can also be processed under a single temperature condition for the production of a sandwich structure or an integrally molded article, and the productivity is improved by the resulting reduction in the number of production steps and expansion of the process window. Therefore, the broader the width of the overlapping temperature range, the more preferred it is, and the width of the overlapping temperature range is preferably not less than 15° C., more preferably not less than 30° C. or so.

As the usable temperature region of the thermoplastic resin (A) (TA1 to TA2) and that of the thermoplastic resin (B) (TB1 to TB2), values determined in accordance with the following standards can be employed. As the usable lower limit temperatures TA1 and TB1, a melting point determined in accordance with JIS K7120 (1987) is used for a crystalline thermoplastic resin and a value obtained by adding 100° C. to the Vicat softening temperature determined in accordance with JIS K7206 (1999) is used for an amorphous thermoplastic resin. Further, as usable upper limit temperatures TA2 and TB2, values obtained by subtracting 50° C. from the temperature at which a 1% weight reduction from the baseline weight is observed (weight loss initiation temperature) in each heat weight-loss curve determined in accordance with JIS K7120 (1987) are used.

In the sandwich laminate, the sheet-form intermediate substrate used as a layer for forming a core has a thermal expansibility. The term "thermal expansibility" refers to an ability of the reinforcement fibers contained in the sheet-form intermediate substrate in a compressed state under pressure to expand due to a rising force attributed to their elastic modulus when the sheet-form intermediate substrate is heated to a temperature of not lower than the melting point of the thermoplastic resin constituting the sheet-form intermediate substrate. By this, a structure having voids is formed and the thickness of the layer forming a core can be freely controlled within a range permitted by the properties of the reinforcement fibers and the thermoplastic resin.

Meanwhile, one example of the mode of a sheet-form intermediate substrate having no thermal expansibility is a mode in which the fiber-reinforced mat does not assume a nonwoven fabric form. Specific examples thereof include a sheet substrate, a woven fabric substrate and a non-crimped substrate, in which reinforcement fibers are not unidirectionally arranged. In a substrate of the above-described mode, since reinforcement fibers are arranged planarly in the sheet-form intermediate substrate, the rising force attributed to the reinforcement fibers is small so that the thermal expansibility cannot be attained at such a level that can provide satisfactory light-weightness, which is one of the desired effects. In other words, when the fiber-reinforced mat is in a nonwoven fabric form, the sheet-form intermediate substrate exhibits a thermal expansibility preferable for exerting the desired effects. This is because, since reinforcement fibers constituting a nonwoven fabric are usually dispersed in the below-described monofilament/nearly monofilament form, the reinforcement fibers are oriented in the thickness direction of the sheet-form intermediate substrate and this enables to effectively utilize the elastic modulus of the reinforcement fibers. From the standpoint of the flexibility in the thermal expansibility, it is preferred that the nonwoven fabric composed of reinforcement fibers be constituted by fine-denier strands of less than 500 reinforcement fiber monofilaments.

It is preferred that the reinforcement fibers contained in the mat used in the sandwich laminate penetrate through interface layers formed by the thermoplastic resin (A) constituting the layers forming a skin and the thermoplastic resin (B) constituting the layer forming a core. One example of a condition where the reinforcement fibers penetrate the interface layers is the mode shown in FIG. 1. That is, in the interface layers formed by the thermoplastic resin (A) constituting the layers forming a skin and the thermoplastic resin (B) constituting the layer forming a core, the reinforcement fibers (4 in FIG. 1) exist to include the thermoplastic resin (A) (3 in FIG. 1) and the thermoplastic resin (B) (2 in FIG. 1). In other words, the thermoplastic resin (A) and the thermoplastic resin (B) are in a strongly bonded state by the anchoring provided by the reinforcement fibers. The penetration amount of the reinforcement fibers (penetrating single filaments 5 and 6 shown in FIG. 1) is not particularly restricted as long as it does not impair the desired effects. However, from the standpoint that the fiber-reinforced mat functions as a bonding medium and correlates with the bondability between the layers forming a skin and the layer forming a core, it is preferred that the fiber-reinforced mat be in a state where the reinforcement fibers penetrate both of the thermoplastic resins (A) and (B) by at least 1 mm, more preferably 2 mm or more. In the second sandwich laminate, many of the reinforcement fibers penetrating through the interface layers usually originate from the sheet-form intermediate substrate used as the layer forming a core, while in the first sandwich laminate, such reinforcement fibers may originate from either the sheet-form intermediate substrates used as the layers forming a skin or the sheet-form intermediate substrate used as the layer forming a core. However, it is usually preferred that the reinforcement fibers of both the substrates be penetrating through the interface layers.

Further, in the sandwich laminate, from the standpoint of the bonding between the layers forming a skin and the layer forming a core, it is preferred that the interface layers be formed to have a concave-convex shape with a maximum height Ry of not less than 50 μm and an average roughness Rz of not less than 30 μm. By adopting this mode, a sandwich laminate in which the thermoplastic resins (A) and (B) are strongly bonded with each other can be obtained and, in turn, when such a sandwich laminate is used to produce a sandwich structure, a sandwich structure in which the thermoplastic resins (A) and (B) are strongly bonded with each other can be obtained. Moreover, according to the above-described mode of the interface layers, the combination of the thermoplastic resins to be used is not particularly restricted. That is, by forming an anchoring structure in which different resins are incorporated in an intricate manner via a fiber-reinforced mat, the compatibility and affinity between different thermoplastic resins, which should conventionally be considered in mechanical bonding of different thermoplastic resins, can be ignored, and our laminates have a special effect in that even a combination of thermoplastic resins for which bonding is considered difficult by nature can be easily and strongly bonded. The desired effects can be sufficiently exerted as long as the maximum height Ry and the average roughness Rz in the interface layers are not less than 50 μm and not less than 30 μm, respectively, and from the standpoint of ensuring the desired effects, maximum Ry and Rz values of 300 μm and 100 μm, respectively, are adequate.

Figure 2:
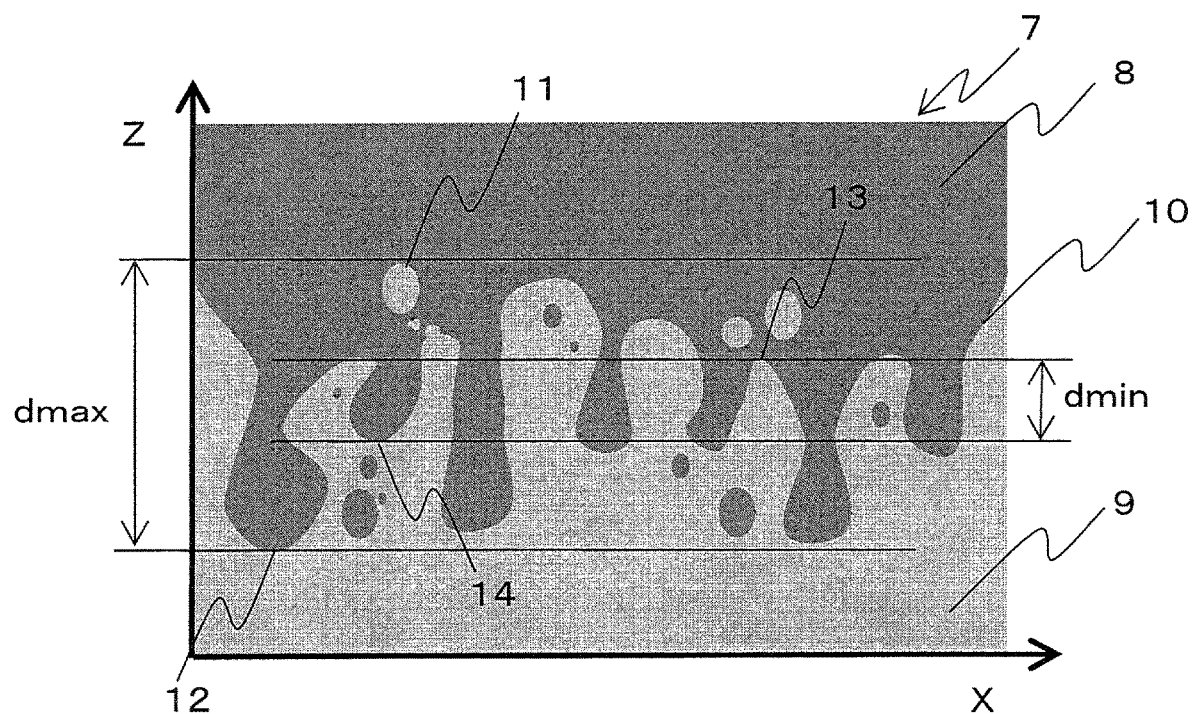
FIG. 2 is a schematic view showing one example of an interface layer of the sandwich laminate, in which the reinforcement fibers are not shown.

The interface layers formed by the thermoplastic resins (A) and (B) in the sandwich laminate will now be described in detail referring to FIG. 2. FIG. 2 is an enlarged view showing an interface layer of thermoplastic resins (A) and (B) along a vertical cross-section taken with respect to the planar direction X of a sandwich laminate 7. In FIG. 2, a thermoplastic resin (A) 8 and a thermoplastic resin (B) 9 are impregnated into a fiber-reinforced mat (not shown) and, substantially in the center of the thickness direction Z of the sandwich laminate, an interface layer 10 having a concave-convex shape extending in the planar direction X is formed via the fiber-reinforced mat. In the thickness direction Z, this interface layer has a plurality of concave portions and convex portions, and the difference in the Z direction between a deepest concave portion 11 and a most protruded convex portion 12 is defined as "dmax." Although the concave portion 11 has an appearance of an independent island in FIG. 2, with inclusion thereof, the deepest portion having the greatest intrusion amount is regarded as the farthest edge for each of the concave and convex portions. Meanwhile, in the concave-convex shape of the interface layer, the difference in the Z direction between a shallowest concave portion 13 and a least protruded convex portion 14 is defined as "dmin." The dmax is the maximum height Ry, and an average value of dmax and dmin is defined as the average roughness Rz.

The maximum height Ry and the average roughness Rz can be determined based on observation of a cross-section of the subject sandwich laminate. A sample is prepared by polishing the sandwich laminate such that a vertical cross-section along the thickness direction is exposed as an observation surface. By observing the thus obtained sample under a microscope, an image corresponding to FIG. 2 (reinforcement fibers are not shown) can be confirmed in the viewing field. On this image, in the concave-convex interface, the vertical difference between the deepest concave portion and the most protruded convex portion, dmax, and the vertical difference between the shallowest concave portion and the least protruded convex portion, dmin, both of which are defined above, are each measured. By repeating this operation 10 times for different images, the largest value of the thus measured dmax values can be adopted as the maximum height Ry (μm) of the concave-convex shape in the interface layer. Further, a value obtained by dividing a sum of the thus measured dmax and dmin values by the number of measurements can be adopted as the average roughness Rz of the concave-convex shape in the interface layer.

The reinforcement fibers used in the sandwich laminate may be in any arrangement as long as the sheet-form intermediate substrate exhibits a thermal expansibility.

However, it is preferred that the reinforcement fibers be dispersed in a monofilament and/or nearly monofilament form and it is more preferred that the reinforcement fibers be also distributed randomly. Since the mat of such a mode has excellent shaping property, it is easily shaped into a complex form. In addition, fine voids are formed by the mat and this allows the thermoplastic resins (A) and (B) to form more intricate interfaced so that excellent bonding performance is exhibited. Moreover, according to the preferred mode, the weak parts at the fiber bundle ends are minimized. Therefore, in addition to excellent bonding performance, reinforcing efficiency and reliability, isotropy is also imparted. The term "nearly monofilament" used herein refers to a state where the reinforcement fibers exist as fine-denier strands of less than 500 reinforcement fiber monofilaments.

Further, the phrase "dispersed in a monofilament form" refers to a state where, in the reinforcement fibers arbitrarily selected in the sandwich laminate, the ratio of single filaments having a two-dimensional contact angle of 1° or larger (hereinafter, this ratio is also referred to as "fiber dispersion rate") is 80% or higher, in other words, a state where the ratio of bundles formed by two or more single filaments in parallel and contact with each other is less than 20% in the constituting elements. Accordingly, the phrase applies only to a fiber-reinforced mat in which the weight ratio of fiber bundles having 100 or less filaments corresponds to 100%.

The term "two-dimensional contact angle" used herein refers to an angle formed between a single filament of discontinuous reinforcement fiber and another single filament in contact therewith. Of the angles formed by the single filaments in contact with each other, the "two-dimensional contact angle" is defined as the angle on the acute side of 0° to 90°. This two-dimensional contact angle will now be further described referring to the drawings. FIGS. 3A and 3B show one example and are schematic views of discontinuous reinforcement fibers contained in a sandwich laminate, which are observed from (a) the planar direction and (b) the thickness direction. Using a single filament 15 as a reference, in FIG. 3A, the single filament 15 is observed to intersect with single filaments 16 to 20. However, in FIG. 3B, the single filament 15 is not in contact with the single filaments 19 and 20. In this case, with respect to the reference single filament 15, the two-dimensional contact angle is evaluated for the single filaments 16 to 18 and, of the two angles formed by two single filaments in contact with each other, the two-dimensional contact angle is an angle 21 on the acute side of 0° to 90°.

The method of measuring the two-dimensional contact angle is not particularly restricted, and examples thereof include a method of observing the orientation of the reinforcement fibers from the surface of the sandwich laminate. In this case, by exposing the reinforcement fibers by grinding the surface of the sandwich laminate, the reinforcement fibers are more easily observed. In addition, for example, a method of photographing an image of the reinforcement fiber orientation by X-ray CT scan observation can also be employed. When the reinforcement fibers have high X-ray permeability, it is preferred to mix the reinforcement fibers with tracer fibers in advance or to coat the reinforcement fibers with a tracer agent in advance, because such a treatment makes it easier to observe the reinforcement fibers. Further, when it is difficult to perform measurement by the above-described methods, for example, a method in which, after heating the sandwich laminate at a high temperature using a heating furnace or the like to burn off the thermoplastic resin components, the fiber-reinforced mat is recovered and the orientation of the reinforcement fibers therein is observed under a light microscope or electron microscope, can be employed.

Based on any of the above-described observation methods, the fiber dispersion rate is determined by the following procedure. With respect to a randomly selected single filament (single filament 15 shown in FIG. 3), the two-dimensional contact angles formed with all of the single filaments that are in contact therewith (single filaments 16 to 18 shown in FIG. 3) are measured. This measurement is performed for 100 single filaments and the fiber dispersion rate is calculated from the ratio between the total number of single filaments for which the two-dimensional contact angle was measured and the number of single filaments having a two-dimensional contact angle of 1° or larger.

Particularly preferably, the reinforcement fibers are randomly dispersed in the fiber-reinforced mat. The phrase "reinforcement fibers are randomly dispersed" used herein means that arbitrarily selected reinforcement fibers in a sandwich laminate have an average two-dimensional orientation angle of 30° to 60°. The term "two-dimensional orientation angle" refers to an angle formed between a single filament of reinforcement fiber and another single filament intersecting therewith. Of the angles formed by the single filaments intersecting with each other, the "two-dimensional orientation angle" is defined as the angle on the acute side of 0° to 90°.

This two-dimensional orientation angle will now be further described referring to the drawings. In FIGS. 3A and 3B, using the single filament 15 as a reference, the single filament 15 intersects with other single filaments 16 to 20. The term "intersect" used herein means a state where a reference single filament is observed to intersect with other single filament in a two-dimensional observation plane. The single filament 15 is not necessarily required to be in contact with the single filaments 16 to 20, and this also applies to a state where the single filaments are observed to intersect with each other in projection. That is, with respect to the reference single filament 15, the two-dimensional orientation angle is evaluated for all of the single filaments 16 to 20 and, of the two angles formed by two intersecting single filaments, in FIG. 3A, the two-dimensional orientation angle is the angle 21 on the acute side of 0° to 90°.

The method of measuring the two-dimensional orientation angle is not particularly restricted. Examples thereof include a method of observing the orientation of the reinforcement fibers from the surface of the subject constituting element, and the same means as the above-described method of measuring the two-dimensional contact angle can be employed. The average two-dimensional orientation angle is determined by the following procedure. With respect to a randomly selected single filament (single filament 15 shown in FIG. 3), the average value of the two-dimensional orientation angles formed with all of the intersecting single filaments (single filaments 16 to 20 shown in FIG. 3) is measured. For instance, when a certain single filament intersects with a large number of other single filaments, an average value determined for 20 of those other intersecting filaments that are randomly selected can be used instead. The above-described measurement is repeated for a total of 5 times using other single filament as a reference, and the average value thereof is calculated as the average two-dimensional orientation angle.

By allowing the reinforcement fibers to be dispersed randomly in a monofilament form, the above-described performance provided by the reinforcement fibers dispersed in a nearly monofilament form can be maximized so that the interface layers exhibits particularly excellent bondability. Further, in the resulting sandwich laminate and sandwich structure as well as an integrally molded article obtained using the same, isotropy can be imparted to the dynamic properties and, since this reduces the internal stress of the interface layers caused by anisotropy, excellent dynamic properties can be imparted to the interface layers. From this standpoint, it is preferred that the fiber-reinforced mat have a fiber dispersion rate of not less than 90% and, the closer the fiber dispersion rate is to the 100%, the more preferred it is. Furthermore, it is preferred that the reinforcement fibers have an average two-dimensional orientation angle of 40° to 50° and, the closer this value is to 45°, which is an ideal angle, the more preferred it is.

Meanwhile, examples of a fiber-reinforced mat that does not take a nonwoven fabric form include a sheet substrate, a woven fabric substrate and a non-crimped substrate, in which reinforcement fibers are not unidirectionally arranged. In these forms, since the reinforcement fibers are regularly and densely arranged, the fiber-reinforced mat contains only a small amount of voids and a thermoplastic resin does not form a satisfactory anchoring structure. Therefore, the use of such a fiber-reinforced mat as a layer for forming a core leads to a reduction in the bonding performance. In addition, impregnation of such a fiber-reinforced mat with a thermoplastic resin is extremely difficult so that non-impregnated parts may be formed and the options for the impregnation means and the resin type may be greatly limited.

The reinforcement fibers constituting the fiber-reinforced mat may be in the form of continuous reinforcement fibers having an infinite length or in the form of discontinuous reinforcement fibers having a limited length that are cut at a prescribed length. However, from the standpoint of easily adjusting the fiber-reinforced mat, it is preferred that the reinforcement fibers constituting the fiber-reinforced mat be discontinuous reinforcement fibers.

It is preferred that the average fiber length Ln of the discontinuous reinforcement fibers be 1 to 25 mm. By controlling the average fiber length Ln in this range, the reinforcing efficiency of the reinforcement fibers can be improved and excellent dynamic properties and bonding strength are imparted not only to the resulting sandwich laminate and sandwich structure but also to integrally molded articles composed of the same. As for the average fiber length Ln, the thermoplastic resin components of the subject sandwich laminate or sandwich structure are burned off; 400 of the remaining reinforcement fibers are randomly selected; the lengths thereof are measured in the order of 10 µm; and the number average thereof is calculated and adopted as the average fiber length Ln.

Further, it is preferred that the reinforcement fibers contained in the interface layers formed by the layers forming a skin and layer forming a core have an anti-plane angle $\theta z$ of 5° or larger. The "anti-plane angle $\theta z$" of a reinforcement fiber means the degree of tilting of the reinforcement fiber with respect to the thickness direction of the sandwich laminate. A larger value indicates that the reinforcement fiber is more tilted and standing toward the thickness direction, and the anti-plane angle $\theta z$ is expressed in a range of 0 to 90°. That is, by controlling the anti-plane angles $\theta z$ of the reinforcement fibers in the above-described range, the reinforcing function in the interface layers can be more effectively exhibited and stronger bonding can be provided in the interface layers. The upper limit value of the anti-plane angles $\theta z$ of the reinforcement fibers is not particularly restricted. However, in view of the fiber volume content in a sandwich laminate, the anti-plane angle $\theta z$ is preferably 15° or smaller, more preferably 10° or smaller.

The anti-plane angles $\theta z$ of the reinforcement fibers can be measured based on observation of a vertical cross-section of sandwich laminate 22 taken along the planar direction. FIG. 4 shows cross-sections of the sandwich laminate along (a) the planar direction and (b) the depth direction. In FIG. 4A, for the simplicity of the measurement, the cross-sections of reinforcement fibers 23 and 24 are approximated to ellipse shapes. The cross-section of the reinforcement fiber 23 appears to have a small aspect ratio of the ellipse (=ellipse major axis/ellipse minor axis), whereas the cross-section of the reinforcement fiber 24 appears to have a large aspect ratio of the ellipse. Meanwhile, according to FIG. 4B, the reinforcement fiber 23 is tilted substantially parallel to the depth direction Y, whereas the reinforcement fiber 24 has a certain amount of tilt with respect to the depth direction Y. In this case, for the reinforcement fiber of the cross-section 22 shown in FIG. 4A, the angle $\theta x$ formed by the planar direction X of the sandwich laminate and the fiber main axis (the major axis direction of the ellipse) $\alpha$ is substantially the same as the anti-plane angle $\theta z$ of the reinforcement fiber. On the other hand, for the reinforcement fiber 24, the angle $\theta x$ and the anti-plane angle $\theta z$ are largely different, and it cannot be said that the angle $\theta x$ reflects the anti-plane angle $\theta z$. Accordingly, when reading out an anti-plane angle $\theta z$ from a vertical cross-section taken along the planar direction of a sandwich laminate, the detection accuracy of the anti-plane angle $\theta z$ can be improved by extracting those reinforcement fibers whose cross-section has at least a certain level of ellipse aspect ratio.

As for the index of the ellipse aspect ratio to be extracted, when single filaments have a cross-sectional shape of a nearly perfect circle, that is, when the fiber aspect ratio is 1.1 or less in a cross-section perpendicular to the longitudinal direction of reinforcement fibers, a method in which the angles formed by the X direction and the fiber main axis a are measured for those reinforcement fibers having an ellipse aspect ratio of 20 or higher and the thus obtained values are adopted as the anti-plane angles $\theta z$ can be employed. Meanwhile, when single filaments have a cross-sectional shape of an ellipse, cocoon or the like and the fiber aspect ratio is 1.1 or higher, it is better to pay attention to those reinforcement fibers having a higher ellipse aspect ratio and to measure their anti-plane angles. It is preferred to measure the anti-plane angle $\theta z$ by selecting: reinforcement fibers having an ellipse aspect ratio of 30 or higher when the fiber aspect ratio is 1.1 to less than 1.8; reinforcement fibers having an ellipse aspect ratio of 40 or higher when the fiber aspect ratio is 1.8 to less than 2.5; and reinforcement fibers having an ellipse aspect ratio of 50 or higher when the fiber aspect ratio is 2.5 or higher.

Examples of the reinforcement fibers and continuous reinforcement fibers that constitute a fiber-reinforced mat include metal fibers made of aluminum, brass, stainless steel and the like; PAN-based, rayon-based, lignin-based and pitch-based carbon fibers; insulating fibers such as graphite fibers and glass fibers; organic fibers made of aramid, PBO, polyphenylene sulfide, polyester, acryl, nylon, polyethylene and the like; and inorganic fibers made of silicon carbide, silicon nitride and the like. Further, these fibers may be subjected to a surface treatment. Examples of the surface treatment include a coating treatment with a metal as a conductor; a treatment with a coupling agent; a treatment with a sizing agent; a treatment with a bundling agent; and an additive-adhering treatment. These reinforcement fibers may be used individually, or two or more thereof may be used in combination. Thereamong, from the standpoint of the weight-reducing effect, carbon fibers having excellent specific strength and specific rigidity such as PAN-based, pitch-based and rayon-based carbon fibers, are preferably used. Further, from the standpoint of improving the economical efficiency of the resulting molded article, glass fibers are preferably used and, from the standpoint of the balance between dynamic properties and economical efficiency, it is particularly preferred to use carbon fibers and glass fibers in combination. Moreover, from the standpoint of improving the shock-absorbing and shaping properties of the resulting molded article, aramid fibers are preferably used and, from the standpoint of the balance between dynamic properties and shock-absorbing properties, it is particularly preferred to use carbon fibers and aramid fibers in combination. Still further, from the standpoint of improving the electroconductivity of the resulting molded article, reinforcement fibers coated with a metal such as nickel, copper or ytterbium can also be used. Among the above-described fibers, PAN-based carbon fibers can be more preferably used because of their excellent strength and dynamic properties such as elastic modulus.

The thermoplastic resins (A) and (B) constituting the sandwich laminate may each be composed of a thermoplastic resin substantially different from the other thermoplastic resin. The term "thermoplastic substantially different" used herein means that a component accounted for 50 parts by weight or more of the components constituting this resin is not commonly contained in the other thermoplastic resin. Examples of the thermoplastic resins include: crystalline resins, for example, "polyesters such as polyethylene terephthalate (PET), polybutylene terephthalate (PBT), polytrimethylene terephthalate (PTT), polyethylene naphthalate (PEN) and liquid crystal polyester, polyolefins such as polyethylene (PE), polypropylene (PP) and polybutylene, polyoxymethylene (POM), polyamide (PA), polyarylene sulfides such as polyphenylene sulfide (PPS), polyketone (PK), polyether ketone (PEK), polyether ether ketone (PEEK), polyether ketone ketone (PEKK), polyether nitrile (PEN), fluorocarbon resins such as polytetrafluoroethylene, and liquid crystal polymers (LCP);" amorphous resins, for example, "styrene-based resins, polycarbonate (PC), polymethyl methacrylate (PMMA), polyvinyl chloride (PVC), polyphenylene ether (PPE), polyimide (PI), polyamide imide (PAI), polyether imide (PEI), polysulfone (PSU), polyether sulfone and polyarylate (PAR);" phenolic resins; phenoxy resins; polystyrene-based, polyolefin-based, polyurethane-based, polyester-based, polyamide-based, polybutadiene-based, polyisoprene-based, fluorocarbon-based and acrylonitrile-based thermoplastic elastomers; and thermoplastic resins selected from copolymers, modification products and the like of the above-described resins. Thereamong, polyolefins are preferred from the standpoint of lightweightness of the resulting molded article; polyamides are preferred from the standpoint of strength; amorphous resins such as polycarbonates, styrene-based resins and modified polyphenylene ether-based resins are preferred from the standpoint of surface appearance; polyarylene sulfides are preferred from the standpoint of heat resistance; and polyether ether ketone is preferably used from the standpoint of continuous use temperature.

The thermoplastic resins exemplified above may also contain an impact resistance-improving agent such as an elastomer or a rubber component as well as other filler(s) and additive(s) in such a range that does not adversely affect the objects of the disclosure. Examples of the fillers and additives include inorganic fillers, flame retardants, conductivity-imparting agents, nucleating agents, ultraviolet absorbers, antioxidants, damping agents, antibacterial agents, insect repellents, deodorants, color inhibitors, heat stabilizers, mold release agents, antistatic agents, plasticizers, lubricants, coloring agents, pigments, dyes, foaming agents, foam inhibitors and coupling agents.

It is preferred that the sandwich laminate have a fiber volume content Vf of 10 to 40% by volume. The Vf means the volume content of reinforcement fibers in the sandwich laminate. From the standpoint of the dynamic properties of the sandwich laminate as well as those of the below-described sandwich structure and integrally molded article, it is preferred to control the Vf in the above-described range.

One example of a method of producing the fiber-reinforced mat constituting the sandwich laminate is a method of producing a fiber-reinforced mat in which reinforcement fibers are dispersed in advance in the form of strands and/or monofilaments. Examples of known technologies for producing a fiber-reinforced mat include dry processes such an airlaid method in which reinforcement fibers are dispersed by air flow to prepare a sheet and a carding method in which the shape of reinforcement fibers is adjusted by mechanical comb-cutting to prepare a sheet; and wet processes carried out by Radright method of making a paper by stirring reinforcement fibers in water. Examples of a means of allowing reinforcement fibers to be almost in a monofilament form include, as dry processes, a method of arranging fiber-opening bars, a method of vibrating fiber-opening bars, a method of refining card openings and a method of adjusting the card rotational speed; and, as wet processes, a method of adjusting the stirring conditions of reinforcement fibers, a method of reducing the reinforcement fiber concentration in a dispersion, a method of adjusting the viscosity of a dispersion and a method of inhibiting generation of vortex flow during transfer of a dispersion. It is particularly preferred that the fiber-reinforced mat be produced by a wet process and, by increasing the concentration of the loaded fibers and by adjusting the flow rate (flow amount) of dispersion and the speed of mesh conveyor, the ratio of the reinforcement fibers in the fiber-reinforced mat can be easily adjusted. For example, a reduction in the speed of the mesh conveyor relative to the flow rate of the dispersion makes it unlikely that the fibers in the resulting fiber-reinforced mat are oriented in the drawing direction, and this enables the production of a bulky fiber-reinforced mat. The fiber-reinforced mat may be constituted of reinforcement fibers alone, or the reinforcement fibers may be mixed with a powder-form or fiber-form matrix resin component or an organic or inorganic compound, or the reinforcement fibers may be filled with each other by a resin component.

As a method of producing the first sandwich laminate, from the standpoints of the easiness of forming anchors derived from bonding between the thermoplastic resins (A) and (B) and the easiness of the production, it is preferred to apply pressure to the fiber-reinforced mats under a condition where they are heated to at least a temperature at which the thermoplastic resin (A) and the thermoplastic resin (B) are each melted or soften and to thereby impregnate the thermoplastic resins (A) and (B) with the respective fiber-reinforced mats. Specific examples of preferred method include: a method in which a laminate obtained by arranging the thermoplastic resin (B) from both sides of the thickness direction of a fiber-reinforced mat is laminated with another laminate obtained by arranging the thermoplastic resin (A) in the thickness direction of a fiber-reinforced mat in the same manner and the resultant is subsequently melt-impregnated; a method in which a fiber-reinforced mat containing the thermoplastic resin (A) component and a fiber-reinforced mat containing the thermoplastic resin (B) component are each melt-impregnated and they are integrated at the same time; and a method of inserting a sheet-form intermediate substrate obtained by impregnating a fiber-reinforced mat with the thermoplastic resin (B), into an intermediate layer of a sheet-form intermediate substrate obtained by melt-impregnating the thermoplastic resin (A) from both sides of the thickness direction of a fiber-reinforced mat.

Further, also as a method of producing the second sandwich laminate in the same manner as described above, from the standpoints of the easiness of forming anchors derived from bonding and the easiness of the production, it is preferred to apply pressure to the continuous reinforcement fibers and the fiber-reinforced mat under a condition where they are heated to at least a temperature at which the thermoplastic resin (A) and the thermoplastic resin (B) are each melted or soften and to thereby impregnate the thermoplastic resins (A) and (B) with the continuous reinforcement fibers and the fiber-reinforced mats.

A compression molding machine or a double-belt press can be suitably used as equipment to realize the above-described methods. The former is used for batch-type production, and the productivity can be improved by adopting an intermittent-type press system in which two or more apparatuses for heating or cooling are arranged in parallel. The latter is used for continuous-type production and, since continuous processing can be easily performed, excellent continuous productivity is attained.

The sandwich structure will now be described in detail.

The first sandwich structure comprises, as skin layers and a core layer, sheet-form intermediate substrates each obtained by impregnating a fiber-reinforced mat with a thermoplastic resin, wherein a thermoplastic resin (A) constituting the skin layers and a thermoplastic resin (B) constituting the core layer form interface layers with a concave-convex shape having a maximum height Ry of not less than 50 μm and an average roughness Rz of not less than 30 μm, and the core layer forms a structure comprising the reinforcement fibers coated with the thermoplastic resin (B) as a support, with continuous voids being formed in the structure.

The second sandwich structure comprises: as a core layer, a sheet-form intermediate substrate obtained by impregnating a fiber-reinforced mat with a thermoplastic resin; and, as skin layers, sheet-form intermediate substrates each obtained by impregnating continuous reinforcement fibers with a thermoplastic resin, wherein a thermoplastic resin (A) constituting the skin layers and a thermoplastic resin (B) constituting the core layer form interface layers with a concave-convex shape having a maximum height Ry of not less than 50 μm and an average roughness Rz of not less than 30 μm, and the core layer forms a structure comprising the reinforcement fibers coated with the thermoplastic resin (B) as a support, with continuous voids being formed in the structure.

From the standpoint of sufficiently bonding the skin layers with the core layer in the interface layer, the thermoplastic resin (A) constituting the skin layers and the thermoplastic resin (B) constituting the core layer form interface layers with a concave-convex shape having a maximum height Ry of not less than 50 μm and an average roughness Rz of not less than 30 μm. When the maximum height Ry is less than 50 μm, the height of the concave-convex shape in the interface layers between the skin layers and the core layer is low and satisfactory bonding strength cannot thus be attained so that delamination occurs; therefore, a satisfactory sandwich structure cannot be obtained. Further, an average roughness Rz of less than 30 μm indicates that the concave-convex shape in the interface layers between the skin layers and the core layer is variable depending on the part throughout the sandwich structure. Since this may lead to partial delamination of the skin layers from the core layer in the sandwich structure, a satisfactory sandwich structure cannot be obtained. The desired effects can be sufficiently exerted as long as the maximum height Ry and the average roughness Rz in the interface layers are not less than 50 μm and not less than 30 μm, respectively, and from the standpoint of ensuring the desired effects, maximum Ry and Rz values of 300 μm and 100 μm, respectively, are more preferred.

The maximum height Ry, average roughness Rz, anti-plane angle θz of the reinforcement fibers and the like in the sandwich structure can be measured in the same manner as in the measurement methods described above for sandwich laminate, except that the terms "sandwich laminate," "layers forming a skin" and "layer forming a core" that are used in the above descriptions are replaced with "sandwich structure," "skin layers" and "core layer," respectively.

The core layer forms a structure comprising reinforcement fibers coated with the thermoplastic resin (B) as a support, with continuous voids being formed in the structure. The term "continuous voids" used herein means voids having a reticulated shape formed by intersecting reinforcement fibers and refers to a state in which the adjacent reticulate voids penetrate with each other. For example, when the reinforcement fibers are randomly dispersed in a monofilament or nearly monofilament form, the continuous voids are formed by the intersecting monofilaments (or nearly monofilaments) of the randomly dispersed reinforcement fibers. Meanwhile, when the voids in the core layer are not continuous and each have a so-called independent structure, the adjacent voids having a reticulated shape are isolated from each other.

The state of the voids can be judged by observing the voids formed by the intersecting reinforcement fibers contained in the core layer. Specifically, a central portion of the core layer in the thickness direction is exposed by scraping with a razor blade or the like in the direction of the substrate plane to prepare a specimen, and 400 spots on the exposed surface is observed under a light microscope, electron microscope or the like. As the state of the voids, any one of the structures accounted for the majority of all structures can be adopted.

In such a structure, when a sandwich structure is obtained by heating the above-described sandwich laminate, because of expansion associated with the heating, the reinforcement fibers coated with the thermoplastic resin function as columnar supports to form an expanded structure, and continuous voids are thereby formed. As in the case of the layer forming a core of the sandwich laminate, this is based on the property of the reinforcement fibers contained in the core layer in a compressed state under pressure to expand due to a rising force attributed to their elastic modulus.

As for the state where the reinforcement fibers are coated with a thermoplastic resin, from the standpoints of the shape stability of the core layer and the flexibility in the expansion ratio at which the core layer is expanded by heating, the reinforcement fibers are in a satisfactory state as long as at least the intersections of single filaments of the reinforcement fibers constituting the core layer are coated and, in a more preferred mode of the coated state, the thermoplastic resin does not allow the surfaces of the reinforcement fibers to be exposed, in other words, the thermoplastic resin forms a coating film on the reinforcement fibers in an electric wire form. This provides the core layer with stability in its shape. Further, in the state where the reinforcement fibers are coated with the thermoplastic resin, it is not required that all of the reinforcement fibers constituting the core layer be coated, and the reinforcement fibers may be coated to such an extent where the shape stability and tensile shear bonding strength of the core layer in the sandwich laminate are not impaired.

As the reinforcement fibers and thermoplastic resins to be used in the sandwich structure, from the standpoint of allowing the sandwich structure to have the same effects as those of the above-described sandwich laminate, the same reinforcement fibers and thermoplastic resins as those used in the sandwich laminate can be preferably exemplified.

In the method of producing a sandwich structure, it is preferred that the above-described sandwich laminate be heated to allow the layer for forming a core to expand at a prescribed expansion ratio and the layer for forming a core be thereby converted into a core layer. The expansion ratio at which the layer forming a core expands is preferably 1.5 to 10-fold, because this allows the core layer formed by the expansion of the layer forming a core to have excellent shear strength and compressive strength, which are indices of the dynamic properties. Superior dynamic properties are obtained at a smaller expansion ratio while superior light-weight properties are obtained at a higher expansion ratio. Therefore, from the standpoint of the balance of these properties, the expansion ratio is more preferably in a range of 2 to 8-fold, particularly preferably 3 to 5-fold. The expansion ratio is an index pertaining to thickness, which is indicated as a ratio of the thickness of the core layer after expansion by heating with respect to the thickness of the layer for forming a core prior to the heating.

As a method of producing the sandwich structure, from the standpoint of the bondability derived from the formation of anchors by the skin layers and the core layer, it is preferred to employ a method of producing the sandwich structure by at least the following steps [1] and [2]:

step [1]: the step of applying pressure in a condition where the thermoplastic resin (A) and the thermoplastic resin (B) are heated to at least a temperature at which the thermoplastic resin (A) and the thermoplastic resin (B) are each melted or soften, to impregnate the mat composed of the reinforcement fibers or the continuous reinforcement fiber(s) with the thermoplastic resin (A) to form layers forming a skin, and to impregnate the mat composed of the reinforcement fibers with the thermoplastic resin (B) to form a layer forming a core; and step [2]: the step of subsequently adjusting the thicknesses of the layers forming a skin and the layer forming a core with heating to allow the layer forming a core to expand.

As a method of producing the fiber-reinforced mat constituting the sandwich structure, the same production methods as those described above for the fiber-reinforced mat in the sandwich laminate can be preferably exemplified. Further, as the continuous reinforcement fibers, the ones described above such as UD are used.

For the step [1], a method of producing a sheet-form intermediate substrate by the same process used for the above-described sandwich laminate can be exemplified as a preferred mode.

The step [2] is a step of forming a core layer by adjusting the thickness of the sheet-form intermediate substrate obtained in the step [1] with heating and thereby allowing the layer for forming a core to expand. As for the temperature of the heating in this step, from the standpoints of thickness control and production rate of the resulting sandwich structure, it is preferred to apply heat in an amount sufficient for melting or softening the thermoplastic resin (B) constituting the layer for forming a core. Specifically, it is preferred that the heating be performed at a temperature higher than the melting point of the thermoplastic resin by at least 10° C. but not higher than the thermal decomposition temperature of the thermoplastic resin. Further, the method of controlling the thickness is not restricted as long as the heated sheet-form intermediate substrate can be controlled to have a desired thickness, and examples of a method preferred from the standpoint of the simplicity of production include a method of restricting the thickness using a metal plate or the like; and a method of controlling the thickness with pressure.

In the same manner as the apparatuses exemplified above for the method of producing a sandwich laminate, a compression molding machine or a double-belt press can be suitably used as equipment to realize the above-described method.

The sandwich structure is preferable because its light-weightness and stiffness can be utilized by integrating it with other member(s) into an integrally molded article. In this case, an integrally molded article can be obtained by bonding a first member composed of the sandwich structure with a second member composed of other molded body by welding or the like. The first member and the second member composed of other molded body assume a bonded structure. The thermoplastic resin constituting the second member is required to be sufficiently welded with the first member. Therefore, it is preferred that the thermoplastic resin constituting the second member be substantially the same or completely the same as the thermoplastic resin (A) or (B) constituting the bonding surface of the first member.

The second member to be integrated is not particularly restricted, and examples thereof include UD prepregs and woven fabric prepregs that are reinforced with continuous reinforcement fibers; fiber-reinforced molding base materials such as GMTs, SMCs and long fiber-reinforced prepregs that are reinforced with discontinuous reinforcement fibers; and nonfiber-reinforced molding base materials such as resin sheets and foamed articles. Thereamong, from the standpoint of the dynamic properties of the resulting molded article, the second member is preferably a fiber-reinforced molding base material and, from the standpoint of improving the reinforcing effect in the molded article, the second member is preferably a continuous fiber-reinforced prepreg. To allow the molded article to have a complex shape, a discontinuous fiber-reinforced prepreg having excellent shaping property can be preferably used.

The means of bonding the first member and the second member is not particularly restricted, and examples thereof include (i) a method in which the first member and the second member are separately molded in advance and then bonded together; and (ii) a method in which the first member is molded in advance and the thus molded first member and the second member are bonded simultaneously with molding of the second member. In the method (i), specifically, for example, the first member is press molded and the second member is prepared by press molding or injection molding. The thus prepared members are bonded by a known welding means such as hot plate welding, vibration welding, ultrasonic welding, laser welding, electric resistance welding or induction heat welding. Meanwhile, a specific example of the method (ii) is a method in which, after arranging the first member obtained by press molding in an injection molding die, the second member-forming material is insert injection molded or outsert injection molded into the die to melt or soften the bonding surface of the first member by the heat of the material in a molten or soften state, thereby bonding the second member, which is a molded body obtained by the injection molding, to the first member. Another specific example of the method (ii) is a method in which, after arranging the first member obtained by press molding in a press molding die, the second member-forming material is also arranged in the press molding die and the first and second members are press-molded, thereby bonding the second member, which is a molded body obtained by press molding, to the first member based on the same principle as described above. From the standpoint of the mass-productivity of integrally molded article, the method (ii) is preferred.

In the above-exemplified latter method of (ii), an integrally molded article is provided by molding a laminate precursor containing a sandwich structure as a lamination unit with heating and pressing by a press molding process. As long as the laminate precursor comprises at least one layer of sandwich structure as a lamination unit, other lamination units are not particularly restricted. Each lamination unit may be based on the fiber-reinforced mat applied to the sandwich structure or it may be based on a UD substrate, a woven fabric substrate, a stitch substrate or the like that does not correspond thereto. Further, the type of the reinforcement fibers is also not particularly restricted as long as the desired characteristics are not adversely affected. One example of the press molding process is so-called hot press molding, which is a method where, after heating a molding die to a temperature of not lower than the molding temperature of the second member in advance, the first member is arranged in the heated molding die which is subsequently clamped and pressed, and a molded article is obtained by cooling the molding die while maintaining this condition. Other examples of the press molding process include so-called stamping molding and heat-and-cool molding, which are methods where the first and second members that have been heated to a temperature of not lower than the molding temperature are arranged in a molding die maintained at a temperature of lower than their solidifying temperatures, which molding die is subsequently clamped and pressed, and an integrally molded article is obtained by cooling the molding die while maintaining this condition. Among these press molding processes, from the standpoint of accelerating the molding cycle to improve the productivity, stamping molding and heat-and-cool molding are preferred.

Examples of the application of mounting members provided by the sandwich structure and integrally molded articles thereof include: electric/electronic device components such as "housings, trays, chasses, interior members and cases of personal computers, displays, OA devices, mobile phones, personal digital assistants, PDAs (personal digital assistants such as electronic notebooks), video cameras, optical instruments, audio devices, air conditioners, lighting devices, recreational goods, toys and other home electric appliances;" structural components for automobiles and two-wheeled vehicles, for example, "various members, various frames, various hinges, various arms, various axles, various axle bearings, various beams," "outside plates and body components such as hoods, roofs, doors, fenders, trunk lids, side panels, rear end panels, front bodies, under bodies, various pillars, various members, various frames, various beams, various supports, various rails and various hinges," "exterior components such as bumpers, bumper beams, moldings, under covers, engine covers, current plates, spoilers, cowl louvers and aero parts," "interior components such as instrument panels, seat frames, door trims, pillar trims, handles and various kinds of modules" and "motor components, CNG tanks and gasoline tanks;" other components for automobiles and two-wheeled vehicles such as "battery trays, headlamp supports, pedal housings, protectors, lamp reflectors, lamp housings, noise shields and spare tire covers;" and aircraft components such as "landing gear pods, winglets, spoilers, edges, ladders, elevators, failings and ribs." From the standpoint of the dynamic properties, the sandwich structure and integrally molded articles thereof are preferably used for automobile interiors and exteriors, electric/electronic device housings, structural materials of bicycles and sporting goods, aircraft interior materials and transport boxes. Particularly, they are suitably used in module members constituted by plural components.

EXAMPLES

Our laminates, structures, molded products and methods will now be described in more detail by way of examples thereof.
(1) Usable Lower Limit Temperatures (TA1 and TB1) of Thermoplastic Resins (A and B)

The melting points or softening points of the thermoplastic resins (A) and (B) impregnated into a sandwich laminate were evaluated as follows. First, for a crystalline resin of the thermoplastic resins (A) and (B), the melting point was measured in accordance with "Testing methods for transition temperatures of plastics" prescribed in JIS K7121 (1987). A sheet or nonwoven fabric used for the preparation of the subject sandwich laminate was dried for at least 24 hours in a vacuum dryer controlled to have a furnace temperature of 50° C. and subsequently cut into small pieces to prepare a sample. For this sample, using a differential scanning calorimeter (DSC 200F3 Maia, manufactured by NETZSCH), the melting point was determined in accordance with the above-mentioned standard.

Meanwhile, for an amorphous resin of the thermoplastic resins (A) and (B), the softening point was measured in accordance with the A50 method of "Plastics—Thermoplastic materials—Determination of Vicat softening temperature (VST)" prescribed in JIS K7206 (1999). A resin pellet, a raw material of a sheet or nonwoven fabric used for the preparation of the subject sandwich structure, was dried for at least 24 hours in a vacuum dryer controlled to have a furnace temperature of 50° C. and subsequently molded using a biaxial kneader and an injection molding machine (Micro-Compounder 15 and 12-ml injection moulder, manufactured by DSM Xplore). From the thus obtained molded piece, a 12.5 mm×12.5 mm square plate of 3.2 min in thickness was cut out and used as a sample. For this sample, using a heat deformation temperature tester (S3-FH, manufactured by Toyo Seiki Seisaku-sho, Ltd.), the softening point was determined in accordance with the above-mentioned standard.

The above-described operations were repeated three times, and the average value of the measured temperatures was calculated and defined as the melting point or softening point of the thermoplastic resins (A) and (B). For the melting point, the thus determined temperatures were adopted as the usable lower limit temperatures (° C.), TA1 and TB1, of the thermoplastic resins (A) and (B), respectively, and for the softening point, temperatures of (softening point+100° C.) were adopted as the usable lower limit temperatures (° C.), TA1 and TB1, of the thermoplastic resins (A) and (B), respectively.

(2) Usable Upper Limit Temperatures (TA1 and TB1) of Thermoplastic Resins (A and B)

The weight loss initiation temperatures of the thermoplastic resins (A) and (B) impregnated into a sandwich laminate were measured in accordance with "Testing methods of plastics by thermogravimetry" prescribed in JIS K7120 (1987). A sheet or nonwoven fabric used for the preparation of the subject sandwich laminate was dried for at least 24 hours in a vacuum dryer controlled to have a furnace temperature of 50° C. and subsequently cut into small pieces to prepare a sample. For this sample, using a thermogravimeter (TG-DTA 2020SA, manufactured by Bruker Corporation), a heat weight-loss curve was obtained in accordance with the above-mentioned standard. In the thus obtained heat weight-loss curve, the temperature at which a 1% weight reduction from the baseline weight was confirmed was defined as the weight loss initiation temperature in the Examples below. The above-described operations were repeated three times, and the average value of the thus obtained weight loss initiation temperatures was calculated and defined as the respective weight loss initiation temperatures of the thermoplastic resins (A) and (B). Further, values obtained by subtracting 50° C. from the respective weight loss initiation temperatures were adopted as practical usable upper limit temperatures (° C.), TA2 and TB2, of the thermoplastic resins (A) and (B).

(3) Ratio of Reinforcement Fibers in Sandwich Laminate, Vf

After measuring the mass of the subject sandwich laminate, Ws, the sandwich laminate was heated in the air at 500° C. for 30 minutes to burn off the thermoplastic resin components. Then, the mass of the residual reinforcement fibers, Wf, was measured, and the ratio thereof was calculated using the following equation:

$$Vf\ (\%\ \text{by volume}) = (Wf/\rho f)/\{Wf/\rho f + (Ws-Wf)/\rho r\} \times 100$$

ρf: density of reinforcement fibers (g/cm$^3$)
ρr: density of thermoplastic resins (g/cm$^3$).

(4) Concave-Convex Shape in Interface Layer of Sandwich Laminate or Sandwich Structure (Ry, Rz)

After cutting out a small section of 25 mm in width from the subject sandwich laminate or sandwich structure and embedding the small section in an epoxy resin, a sample was prepared by polishing the resultant such that a vertical cross-section along the sheet thickness direction was exposed as an observation surface. This sample was observed under a laser microscope (VK-9510, manufactured by Keyence Corporation) at a magnification of ×200, and 10 randomly selected spots (with their viewing fields not overlapping with each other) were photographed. In the photographed image, an interface layer formed by the thermoplastic resins (A) and (B) was verified based on the resin contrast. When the contrast was unclear, the light and dark were clarified by image processing. When the verification was difficult even after this process, a photograph was taken again for a sample prepared from the subject sandwich laminate or sandwich structure in which, of the thermoplastic resins impregnated into the sandwich laminate or sandwich structure, only the thermoplastic resin having a lower TA1 or TB1 was melted or softened to verify an interface layer. For the concave-convex interfaces in each of the photographed 10 viewing fields, the vertical difference between the deepest concave portion and the most protruded convex portion, dmax, and the vertical difference between the shallowest concave portion and the least protruded convex portion, dmin, were each measured. Among the dmax values in each of the 10 viewing fields, the largest value was defined as the maximum height, Ry (μm), of the concave-convex shape in the interface layer. Further, from the thus obtained dmax and dmin values, the average roughness, Rz, of the concave-convex shape of the interface layer was calculated using the following equation:

$$Rz\ (\mu m) = \Sigma(\text{dimax} + \text{dimin})/2n$$

dimax: the maximum vertical difference in each viewing field (i=1, 2, . . . 10) (μm)
dimin: the minimum vertical difference in each viewing field (i=1, 2, . . . 10) (μm)
n: the number of measured viewing fields.

(5) Anti-Plane Angle θz of Reinforcement Fibers in Sandwich Laminate or Sandwich Structure After cutting out a small section of 25 mm in width from the subject sandwich laminate or sandwich structure and embedding the small section in an epoxy resin, a sample was prepared by polishing the resultant such that a vertical cross-section along the sheet thickness direction was exposed as an observation surface. The fiber cross-sectional shape of this sample was observed under a laser microscope (VK-9510, manufactured by Keyence Corporation) at a magnification of ×400. The thus obtained observation image was developed on a general-purpose image analysis software and, using a built-in program of the software, the fiber cross-sections found in the observation image were each extracted. In each fiber cross-section, an inscribed ellipse was made and approximated with the shape of the fiber cross-section (hereinafter, referred to as "fiber ellipse"). Further, for those fiber ellipses having an aspect ratio, which is represented by: the major axis length α of the fiber ellipse/the minor axis length β of the fiber ellipse, of 20 or higher, the angle formed by the X-axis direction and the major axis direction of the fiber ellipse was determined. By repeating the above-described operations for the observation samples extracted from different parts of the subject sandwich laminate or sandwich structure, the anti-plane angle was measured for a total of 600 reinforcement fibers, and the average value thereof was determined as the anti-plane angle θz.

(6) Bonding State of Interface Layers in Sandwich Laminate

Figure 5:
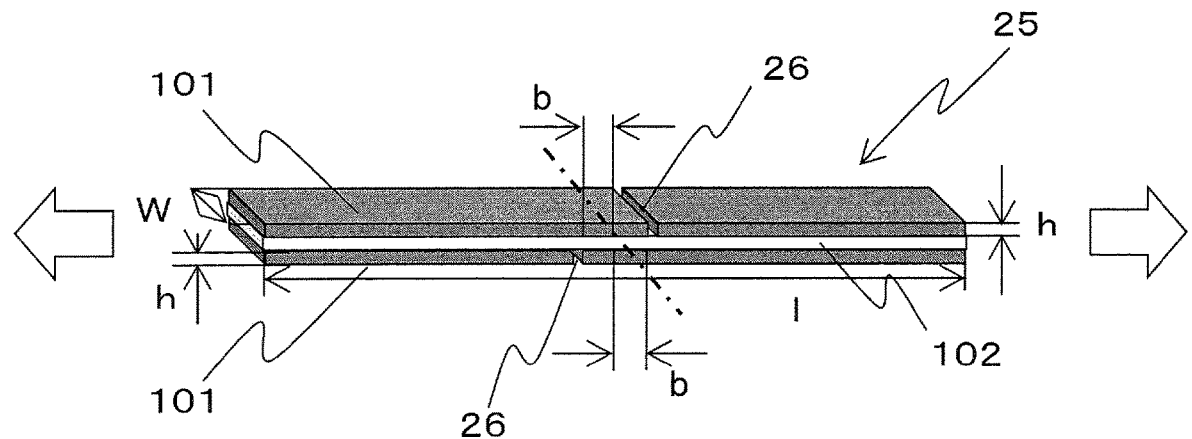
FIG. 5 is a perspective view showing a specimen for tensile-shearing bonding test used in Examples and Comparative Examples.

Referring to "Adhesives—Determination of tensile lap-shear strength of rigid-to-rigid bonded assemblies" prescribed in JIS K6850 (1999), the interface layers of the subject sandwich laminate were fractured by applying thereto a shear load and the fracture mode was observed, thereby evaluating the bonding state of the layers for forming a skin and the layer for forming a core in the sandwich laminate. The specimen used in this test was cut out from each sandwich laminate obtained in Examples. The specimen is shown in FIG. 5. A specimen 25 has a shape in which a notch 26 reaching a thickness (h) of each layer for forming a skin at a width (w) is inserted on both sides of the specimen at different positions along a length (l), and bonded parts are formed between the layers forming a skin and the layer forming a core at a length of b (6.25 mm) from the center of the respective layers forming a skin. Five of the above-described specimen were prepared and fractured by applying thereto a shear load in a tensile direction using a universal tester (universal tester Model 4201, manufactured by Instron). Then, the bonding state of the bonded parts was evaluated by visually observing the surface of the fractured side of each fractured specimen.

The evaluation of the bonding state was classified as follows in the order of more favorable to less favorable bonding between the layers forming a skin and the layer forming a core. In this evaluation, cohesion fracture and fracture of the layer forming a core were judged as favorable bonding states of the layers forming a skin and the layer forming a core.

Cohesion fracture: a state in which fracture occurred in the vicinity of the interfaces between the respective layers forming a skin and the layer forming a core and the component constituting one of the layers forming a skin and the layer forming a core adhered to the surface of other layer.

Fracture of layer forming a core: a state in which only the layer forming a core was fractured.

Fracture of a whole: a state in which the layers forming a skin and the layer forming a core were fractured in the same manner.

Interface layer fracture: a state in which fracture occurred in the vicinity of the interfaces between the respective layers forming a skin and the layer forming a core and the layers forming a skin and the layer forming a core are detached without the component constituting one of the layers adhering to the surface of other layer.

(7) Bonding State of Interface Layer in Sandwich Structure

The bonding state of the skin layers and the core layer in the subject sandwich structure was evaluated by observing the fracture mode thereof in the same manner as in (6) Bonding State of Interface Layer in Sandwich Laminate.

The evaluation of the bonding state was classified as follows in the order of more favorable to less favorable bonding between the skin layers and the core layer. In this evaluation, fracture of the core layer was judged as a favorable bonding state of the skin layers and the core layer.

Fracture of core layer: a state in which fracture occurred in the vicinity of the center of the core layer.

Fracture of skin layers: a state in which only the skin layers was fractured.

Fracture of a whole: a state in which the skin layers and the core layer were fractured in the same manner.

(8) Shear Strength τ2 of Bonded Parts in Integrally Molded Article

Figure 9:
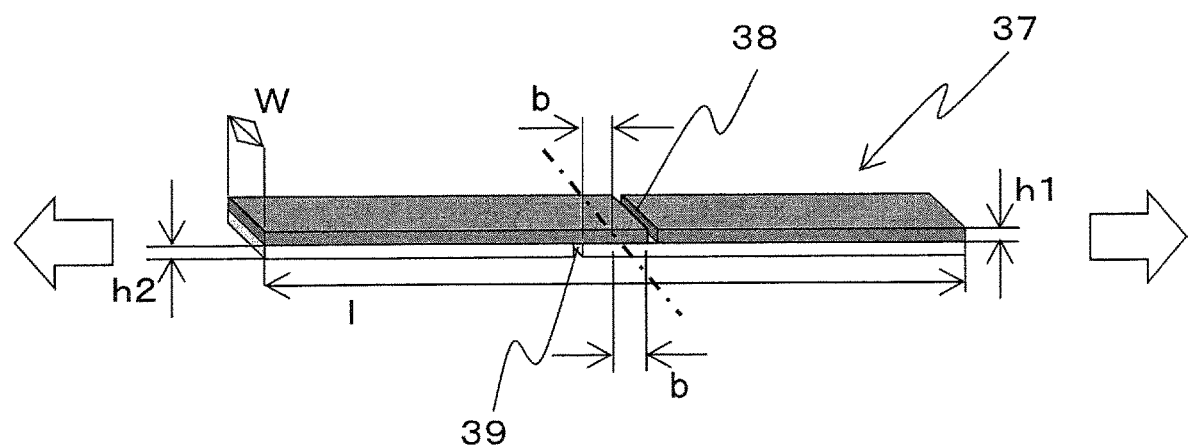
FIG. 9 is a perspective view showing a specimen for tensile-shearing bonding test of an integrally molded article obtained in Examples and Comparative Examples.

Referring to "Adhesives—Determination of tensile lap-shear strength of rigid-to-rigid bonded assemblies" prescribed in JIS K6850 (1999), the shear strength τ2 of bonded parts in the subject integrally molded article was evaluated. The specimen used in this test was cut out from a flat portion of each integrally molded article obtained in Examples. The specimen is shown in FIG. 9. A specimen 37 has a shape in which a notch 38 reaching a thickness (h1) of the first member at a width (w) and a notch 39 reaching a thickness (h2) of the second member at a width (w) are inserted on each side of the specimen at different positions along a length (l) and bonded parts between the first and second members are formed at a length of b (6.25 mm) from the center of the specimen. Five of the above-described specimen were prepared and subjected to a tensile test using a universal tester (universal tester Model 4201, manufactured by Instron). The average value of all data obtained by the test (n=5) was defined as the shear strength τ2 (MPa) of the bonded parts in the integrally molded article.

Reinforcement Fiber I

A polymer containing polyacrylonitrile as a main component was subjected to spinning and burning to obtain continuous carbon fibers having a total of 12,000 filaments. The thus obtained continuous carbon fibers were further subjected to an electrolytic surface treatment and subsequently dried in a heated air of 120° C. to obtain reinforcement fibers I. These carbon fibers had the following properties:

Density: 1.80 g/cm$^3$
Single filament diameter: 7 μm
Tensile strength: 4.9 GPa
Tensile elastic modulus: 230 GPa.

PP Sheet

Using a masterbatch composed of 90% by mass of an unmodified polypropylene resin ("PRIME POLYPRO" (registered trademark) J707G, manufactured by Prime Polymer Co., Ltd.) and 10% by mass of an acid-modified polypropylene resin ("ADMER" (registered trademark) QB510, manufactured by Mitsui Chemicals, Inc.), a sheet having a basis weight of 100 g/m$^2$ was prepared. The properties of the thus obtained sheet are shown in Table 1.

PA6 Sheet

A resin sheet made of a polyamide 6 resin ("AMILAN" (registered trademark) CM1021T, manufactured by Toray Industries, Inc.), which had a basis weight of 124 g/m$^2$, was prepared. The properties of the thus obtained sheet are shown in Table 1.

PA66 Sheet

A resin sheet made of a nylon 66 resin ("AMILAN" (registered trademark) CM3006, manufactured by Toray Industries, Inc.), which had a basis weight of 126 g/m$^2$, was prepared. The properties of the thus obtained sheet are shown in Table 1.

PC Sheet

A resin sheet made of a polycarbonate resin ("LUPILON" (registered trademark) H4000, manufactured by Mitsubishi Engineering-Plastics Corporation), which had a basis weight of 132 g/m$^2$, was prepared. The properties of the thus obtained sheet are shown in Table 1.

PPS Sheet

A resin nonwoven fabric made of a polyphenylene sulfide resin ("TORELINA" (registered trademark) M2888, manufactured by Toray Industries, Inc.), which had a basis weight of 67 g/m$^2$, was prepared. The properties of the thus obtained sheet are shown in Table 1. PPE Sheet A sheet made of a modified polyphenylene ether resin ("NORYL" (registered trademark) PPX7110, manufactured by SABIC), which had a basis weight of 100 g/m$^2$, was prepared. The properties of the thus obtained sheet are shown in Table 1.

5-mm Mat

The reinforcement fibers I were cut at a length of 5 mm to obtain chopped reinforcement fibers. These chopped reinforcement fibers were loaded to an opener to obtain cotton-like reinforcement fiber aggregates containing hardly any reinforcement fiber bundles of the original thickness. The thus obtained reinforcement fiber aggregates were loaded to a carding apparatus equipped with a cylinder roll of 600 mm in diameter, thereby forming a sheet-form web composed of the reinforcement fibers. In this process, the rotation speed of the cylinder roll was 320 rpm and the doffer speed was 13 m/min. The thus obtained web was laminated to obtain a fiber-reinforced mat (5-mm mat). The properties of this fiber-reinforced mat are shown in Table 2.

3-mm Mat

The reinforcement fibers I were cut at a length of 3 mm using a strand cutter to obtain chopped reinforcement fibers. Then, 40 L of a 0.1%-by-weight dispersion medium composed of water and a surfactant (polyoxyethylene lauryl ether (trade name), manufactured by Nacalai Tesque, Inc.) was prepared and loaded to a paper-making apparatus. The paper-making apparatus was constituted by an upper paper-making bath (volume: 30 L) equipped with a stirrer having a rotary blade and a lower storage tank (volume: 10 L), with a porous support being arranged between the paper-making bath and the storage tank. First, the dispersion medium was stirred using the stirrer until fine air bubbles were generated. Then, the chopped reinforcement fibers adjusted to have a desired basis weight were loaded to the dispersion medium in which fine air bubbles were dispersed, and the resultant was stirred to obtain a slurry containing the reinforcement fibers dispersed therein. Thereafter, the slurry was suctioned from the storage tank and dehydrated via the porous support to prepare a fiber-reinforced paper-making body. This paper-making body was dried in a hot-air dryer at 150° C. for 2 hours to obtain a fiber-reinforced mat (3-mm mat). The properties of the thus obtained fiber-reinforced mat are shown in Table 2.

6-mm Mat

A fiber-reinforced mat (6-mm mat) was obtained in the same manner as the 3-mm mat, except that the reinforcement fibers I were cut at a length of 6 mm using a strand cutter to obtain chopped reinforcement fibers. The properties of the thus obtained fiber-reinforced mat are shown in Table 2.

12-mm Mat

A fiber-reinforced mat (12-mm mat) was obtained in the same manner as the 3-mm mat, except that the reinforcement fibers I were cut at a length of 12 mm using a strand cutter to obtain chopped reinforcement fibers. The properties of the thus obtained fiber-reinforced mat are shown in Table 2.

25-mm Mat

The reinforcement fibers I were cut at a length of 25 mm using a strand cutter to obtain chopped reinforcement fibers. The thus obtained chopped reinforcement fibers were allowed to free-fall from a height of 80 cm, thereby preparing a fiber-reinforced mat (25-mm mat) in which the chopped carbon fibers were randomly distributed. The properties of the thus obtained fiber-reinforced mat are shown in Table 2.

UD Substrate

The reinforcement fibers I, which had been subjected to fiber bundle open processing, were parallelly aligned and unidirectionally arranged at a density of 1.4 fibers/cm to form a unidirectional sheet composed of the reinforcement fibers in a sheet form, thereby obtaining a fiber-reinforced mat (UD substrate). The properties of the thus obtained UD substrate are shown in Table 2.

UD Prepreg

The reinforcement fibers I, which had been subjected to fiber bundle open processing, were parallelly aligned and unidirectionally arranged at a density of 1.4 fibers/cm to obtain a sheet-form reinforcement fibers. Then, auxiliary fibers (copolymerized polyamide fibers, melting point: 140° C.) were arranged at a density of 3 fibers/cm in the direction perpendicular to the reinforcement fibers and heated using a far-infrared heater to form a unidirectional sheet retaining the sheet-form. The thus obtained unidirectional sheet was sandwiched with release papers, and the resultant was passed through a double-belt press heated to 180° C. at a rate of 1 m/min under a contact pressure of 1 MPa, thereby completely melting the auxiliary fibers to obtain a UD prepreg filled with the reinforcement fibers.

Woven Fabric Substrate

The reinforcement fibers I were aligned in parallel and unidirectionally arranged at a density of 1.2 fibers/cm to obtain a sheet-form reinforcement fibers. The reinforcement fibers I were also arranged in the direction perpendicular to the above-described reinforcement fibers at a density of 1.2 fibers/cm to interlace the reinforcement fibers with each other and to form a bidirectional woven fabric substrate having a plain weave structure using a weaving loom, thereby obtaining a fiber-reinforced mat (woven fabric substrate). The properties of the thus obtained woven fabric substrate are shown in Table 2.

PA Compound

Using a biaxial extruder (TEX-30α, manufactured by The Japan Steel Works, Ltd.), the reinforcement fibers I were compounded with the masterbatch used for the preparation of the PA6 sheet to produce a pellet for injection molding that had a fiber content of 30% by weight (PA compound).

GMT

A glass fiber-reinforced polypropylene resin molding material (GMT) ("UNI Sheet" (registered trademark) P4038-BK31, manufactured by Quadrant) was molded in the same manner as in Example 1 to obtain a 1.6 mm-thick fiber-reinforced mat (GMT).

Example 1

The 5-mm mat as the fiber-reinforced mat, the PA6 sheet as the thermoplastic resin (A) and the PP sheet as the thermoplastic resin (B) were sequentially arranged in the order of [thermoplastic resin (A)/fiber-reinforced mat/thermoplastic resin (A)/fiber-reinforced mat/thermoplastic resin (B)/fiber-reinforced mat/thermoplastic resin (B)/fiber-reinforced mat/fiber-reinforced mat/thermoplastic resin (B)/fiber-reinforced mat/thermoplastic resin (B)/fiber-reinforced mat/thermoplastic resin (A)/fiber-reinforced mat/thermoplastic resin (A)] to prepare a laminate precursor. Then, a sandwich laminate was obtained through the following press molding conditions (I) to (III):

(I) the laminate precursor was arranged in a press-molding die cavity preheated to 230° C. and the die was closed;

(II) after retaining the die for 120 seconds, a pressure of 3 MPa was applied and the die was retained for another 60 seconds; and (III) the die cavity was opened to recover a sandwich laminate.

The properties of the thus obtained sandwich laminate are shown in Table 3-1.

Example 2

A sandwich laminate was obtained in the same manner as in Example 1, except that the 6-mm mat was used as the fiber-reinforced mat. The properties of the thus obtained sandwich laminate are shown in Table 3-1.

Example 3

A sandwich laminate was obtained in the same manner as in Example 1, except that the 6-mm mat, the PA66 sheet and the PA6 sheet were used as the fiber-reinforced mat, the thermoplastic resin (A) and the thermoplastic resin (B), respectively, and that the resulting laminate precursor was placed in a press-molding die cavity preheated to 250° C. The properties of the thus obtained sandwich laminate are shown in Table 3-1.

Example 4

A sandwich laminate was obtained in the same manner as in Example 1, except that the 6-mm mat, the PPS sheet and the PA66 sheet were used as the fiber-reinforced mat, the thermoplastic resin (A) and the thermoplastic resin (B), respectively, and that the resulting laminate precursor was placed in a press-molding die cavity preheated to 285° C. The properties of the thus obtained sandwich laminate are shown in Table 3-1.

Example 5

A sandwich laminate was obtained in the same manner as in Example 4, except that the 6-mm mat, the PPS sheet and the PC sheet were used as the fiber-reinforced mat, the thermoplastic resin (A) and the thermoplastic resin (B), respectively. The properties of the thus obtained sandwich laminate are shown in Table 3-1.

Example 6

A sandwich laminate was obtained in the same manner as in Example 1, except that the 6-mm mat and the PPE sheet were used as the fiber-reinforced mat and the thermoplastic resin (A), respectively. The properties of the thus obtained sandwich laminate are shown in Table 3-1.

Example 7

A sandwich laminate was obtained in the same manner as in Example 1, except that the 3-mm mat was used as the fiber-reinforced mat. The properties of the thus obtained sandwich laminate are shown in Table 3-1.

Example 8

A sandwich laminate was obtained in the same manner as in Example 1, except that the 12-mm mat was used as the fiber-reinforced mat. The properties of the thus obtained sandwich laminate are shown in Table 3-1.

Example 9

A sandwich laminate was obtained in the same manner as in Example 1, except that the 25-mm mat was used as the fiber-reinforced mat. The properties of the thus obtained sandwich laminate are shown in Table 3-1.

Example 10

As a fiber-reinforced mat for layers for forming a skin, the UD substrate was used. As for the UD substrate, the continuous direction of the reinforcement fibers was defined as 0° and the direction perpendicular thereto was defined as 90°. As a fiber-reinforced mat for layer forming a core, the 5-mm mat was used. As a thermoplastic resin (A) and a thermoplastic resin (B), the PA6 sheet and the PP sheet were used, respectively. A sandwich laminate was obtained in the same manner as in Example 1, except that a laminate precursor was prepared by sequentially arranging these materials in the order of [thermoplastic resin (A)/UD substrate) (0°)/thermoplastic resin (A)/UD substrate)(90°/thermoplastic resin (B)/5-mm mat/thermoplastic resin (B)/5-mm mat/5-mm mat/thermoplastic resin (B)/5-mm mat/thermoplastic resin (B)/UD substrate)(90°/thermoplastic resin (A)/ UD substrate)(0°/thermoplastic resin (A)]. The properties of the thus obtained sandwich laminate are shown in Table 3-1.

Example 11

As a fiber-reinforced mat for layers for forming a skin, the woven fabric substrate was used. As a fiber-reinforced mat for a layer forming a core, the 5-mm mat was used. As a thermoplastic resin (A) and a thermoplastic resin (B), the PA6 sheet and the PP sheet were used, respectively. A sandwich laminate was obtained in the same manner as in Example 1, except that a laminate precursor was prepared by sequentially arranging these materials in the order of [thermoplastic resin (A)/thermoplastic resin (A)/woven fabric substrate/thermoplastic resin (B)/5-mm mat/thermoplastic resin (B)/5-mm mat/thermoplastic resin (B)/thermoplastic resin (B)/woven fabric substrate/thermoplastic resin (A)/ thermoplastic resin (A)]. The properties of the thus obtained sandwich laminate are shown in Table 3-1.

Comparative Example 1

A sandwich laminate was obtained in the same manner as in Example 1, except that the PP sheet was used as the thermoplastic resin (A). The properties of the thus obtained sandwich laminate are shown in Table 3-2.

Comparative Example 2

A sandwich laminate was obtained in the same manner as in Example 2, except that the PP sheet was used as the thermoplastic resin (A). The properties of the thus obtained sandwich laminate are shown in Table 3-2.

Comparative Example 3

A sandwich laminate was obtained in the same manner as in Example 3, except that the PA66 sheet was used as both the thermoplastic resins (A) and (B). The properties of the thus obtained sandwich laminate are shown in Table 3-2.

Comparative Example 4

A sandwich laminate was obtained in the same manner as in Example 2, except that the PP sheet was used as the thermoplastic resin (A) and the PA6 sheet was used as the thermoplastic resin (B). The properties of the thus obtained sandwich laminate are shown in Table 3-2.

Example 12

The 5-mm mat as the fiber-reinforced mat, the PA6 sheet as the thermoplastic resin (A) and the PP sheet as the thermoplastic resin (B) were sequentially arranged in the order of [thermoplastic resin (A)/fiber-reinforced mat/thermoplastic resin (A)/fiber-reinforced mat/thermoplastic resin (B)/fiber-reinforced mat/thermoplastic resin (B)/fiber-reinforced mat/fiber-reinforced mat/thermoplastic resin (B)/fiber-reinforced mat/thermoplastic resin (B)/fiber-reinforced mat/thermoplastic resin (A)/fiber-reinforced mat/thermoplastic resin (A)] to prepare a laminate precursor. Then, a sandwich laminate was obtained through the following press molding conditions (I) and (II):

(I) the laminate precursor was placed in a press-molding die cavity preheated to 230° C. and the die was closed; and (II) after retaining the die for 120 seconds, a pressure of 3 MPa was applied and the die was retained for another 60 seconds.

Next, a sandwich structure was obtained through the following press molding processes (III) to (V):

(III) after the above (II), the die cavity was opened and a metal spacer was inserted at an end of the die cavity to adjust the expansion ratio in the preparation of sandwich structure to be 3-fold;

(IV) subsequently, the die cavity was closed again and the cavity was cooled to 50° C. under a pressure-maintained condition; and (V) the die was opened to recover a sandwich structure.

Figure 6:
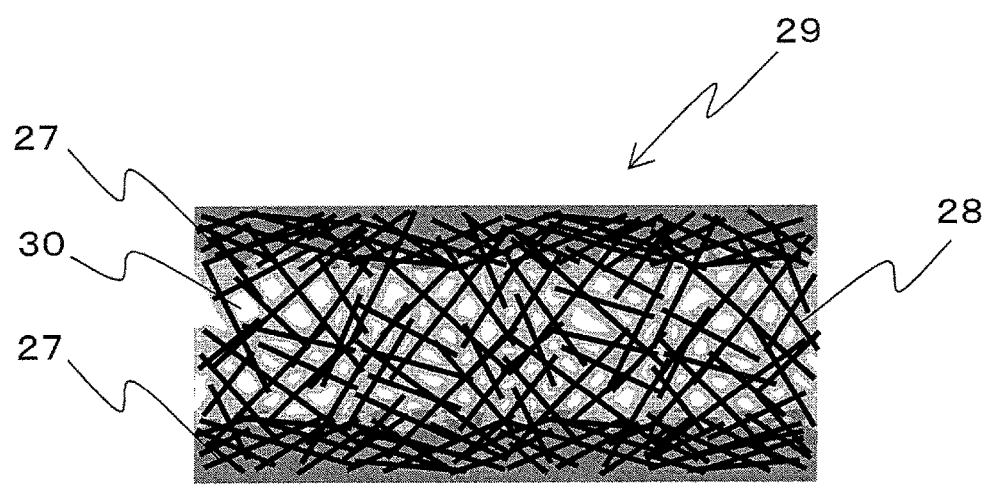
FIG. 6 is a schematic view showing one example of the cross-section of the sandwich structure.

As a result of observing a cross-section of the thus obtained sandwich structure (29 in FIG. 6), it was confirmed that this sandwich structure was constituted by skin layers 27 and a core layer 28 and that the core layer 28 contained therein voids 30 with the reinforcement fibers functioning as columnar supports. The properties of the thus obtained sandwich structure are shown in Table 4-1.

Example 13

A sandwich structure was obtained in the same manner as in Example 12, except that the 6-mm mat was used as the fiber-reinforced mat. The properties of the thus obtained sandwich structure are shown in Table 4-1.

Example 14

A sandwich structure was obtained in the same manner as in Example 12, except that the 6-mm mat, the PA66 sheet and the PA6 sheet were used as the fiber-reinforced mat, the thermoplastic resin (A) and the thermoplastic resin (B), respectively, and that the resulting laminate precursor was placed in a press-molding die cavity preheated to 250° C. The properties of the thus obtained sandwich structure are shown in Table 4-1.

Example 15

A sandwich structure was obtained in the same manner as in Example 12, except that the 6-mm mat, the PPS sheet and the PA66 sheet were used as the fiber-reinforced mat, the thermoplastic resin (A) and the thermoplastic resin (B), respectively, and that the resulting laminate precursor was placed in a press-molding die cavity preheated to 285° C. The properties of the thus obtained sandwich structure are shown in Table 4-1.

Example 16

A sandwich structure was obtained in the same manner as in Example 15, except that the 6-mm mat, the PPS sheet and the PC sheet were used as the fiber-reinforced mat, the thermoplastic resin (A) and the thermoplastic resin (B), respectively. The properties of the thus obtained sandwich structure are shown in Table 4-1.

Example 17

A sandwich structure was obtained in the same manner as in Example 12, except that the 6-mm mat and the PPE sheet were used as the fiber-reinforced mat and the thermoplastic resin (A), respectively. The properties of the thus obtained sandwich structure are shown in Table 4-1.

Example 18

A sandwich structure was obtained in the same manner as in Example 12, except that the 3-mm mat was used as the fiber-reinforced mat. The properties of the thus obtained sandwich structure are shown in Table 4-1.

Example 19

A sandwich structure was obtained in the same manner as in Example 12, except that the 12-mm mat was used as the fiber-reinforced mat. The properties of the thus obtained sandwich structure are shown in Table 4-1.

Example 20

A sandwich structure was obtained in the same manner as in Example 12, except that the 6-mm mat was used as the fiber-reinforced mat and that the expansion ratio in the preparation of the sandwich structure was adjusted to be 1.5-fold using a metal spacer. The properties of the thus obtained sandwich structure are shown in Table 4-1.

Example 21

A sandwich structure was obtained in the same manner as in Example 12, except that the 6-mm mat was used as the fiber-reinforced mat and that the expansion ratio in the preparation of the sandwich structure was adjusted to be 10-fold using a metal spacer. The properties of the thus obtained sandwich structure are shown in Table 4-1.

Example 22

Using the laminate precursor prepared in Example 10, a sandwich structure was obtained through the press molding conditions (I) to (V) employed in Example 12. The properties of the thus obtained sandwich structure are shown in Table 4-1.

Example 23

Using the laminate precursor prepared in Example 11, a sandwich structure was obtained through the press molding conditions (I) to (V) employed in Example 12. The properties of the thus obtained sandwich structure are shown in Table 4-1.

Comparative Example 5

A sandwich structure was obtained in the same manner as in Example 12, except that the PP sheet was used as the thermoplastic resin (A). The properties of the thus obtained sandwich structure are shown in Table 4-2.

Comparative Example 6

A sandwich structure was obtained in the same manner as in Example 12, except that the PP sheet was used as the thermoplastic resin (A). The properties of the thus obtained sandwich structure are shown in Table 4-2.

Comparative Example 7

A sandwich structure was obtained in the same manner as in Example 14, except that the PA66 sheet was used as both the thermoplastic resins (A) and (B). The properties of the thus obtained sandwich structure are shown in Table 4-2.

Comparative Example 8

A sandwich structure was obtained in the same manner as in Example 12, except that the PP sheet was used as the thermoplastic resin (A) and the PA6 sheet was used as the thermoplastic resin (B). The properties of the thus obtained sandwich structure are shown in Table 4-2.

Comparative Example 9

A sandwich structure was obtained in the same manner as in Example 12, except that the 25-mm mat was used as the fiber-reinforced mat. The properties of the thus obtained sandwich structure are shown in Table 4-2.

Example 24

Figure 7:
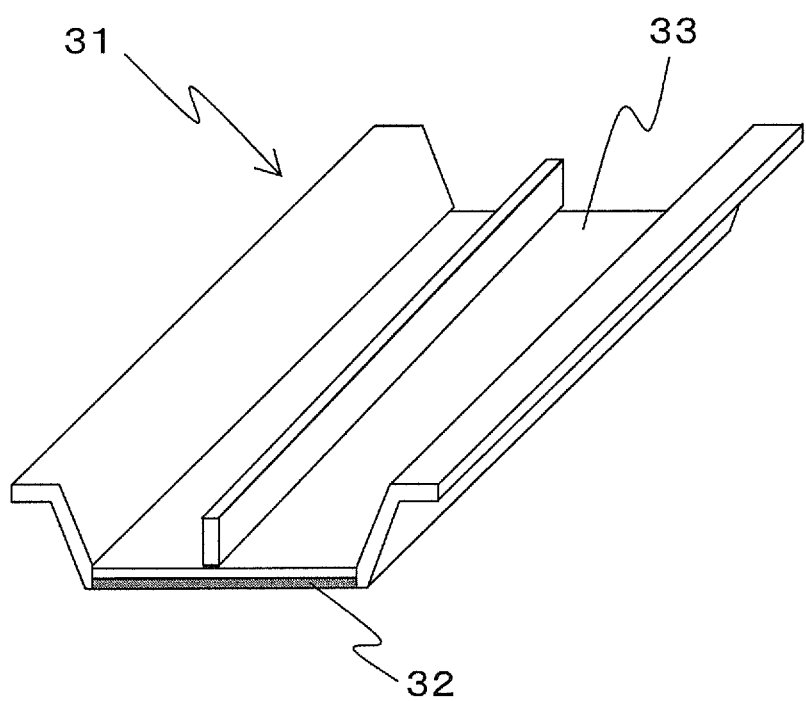
FIG. 7 is a perspective view showing an integrally molded article obtained in Examples and Comparative Examples.

From the sandwich structure of Example 13 (300 mm×300 mm square), a rectangle of 180 mm in length and 70 mm in width was cut out and used as a first member 32. Meanwhile, the PA compound was used for a second member 33. Then, the thus obtained first member was inserted to an injection molding die such that the sandwich structure side of the first member was used as a bonding surface, and the PA compound was injection molded to prepare the second member, thereby obtaining such an integrally molded article 31 as shown in FIG. 7. In this process, the injection molding machine had a cylinder temperature of 280° C. and a die temperature of 60° C. The properties of the thus obtained integrally molded article are shown in Table 5.

Example 25

The integrally molded article 31 shown in FIG. 7 was obtained in the same manner as in Example 24, except that the sandwich structure of Example 19 was used as the first member. The properties of the thus obtained integrally molded article are shown in Table 5.

Example 26

The integrally molded article 31 shown in FIG. 7 was obtained in the same manner as in Example 24, except that the sandwich structure of Example 22 was used as the first member. The properties of the thus obtained integrally molded article are shown in Table 5.

Example 27

The integrally molded article 31 shown in FIG. 7 was obtained in the same manner as in Example 24, except that the sandwich structure of Example 23 was used as the first member. The properties of the thus obtained integrally molded article are shown in Table 5.

Comparative Example 10

The integrally molded article 31 shown in FIG. 7 was obtained in the same manner as in Example 24, except that the sandwich structure of Comparative Example 6 was used as the first member. The properties of the thus obtained integrally molded article are shown in Table 5.

Comparative Example 11

The integrally molded article 31 shown in FIG. 7 was obtained in the same manner as in Example 24, except that the sandwich structure of Comparative Example 8 was used as the first member. The properties of the thus obtained integrally molded article are shown in Table 5.

Comparative Example 12

The integrally molded article 31 shown in FIG. 7 was obtained in the same manner as in Example 24, except that the sandwich structure of Comparative Example 9 was used as the first member. The properties of the thus obtained integrally molded article are shown in Table 5.

Example 28

Figure 8:
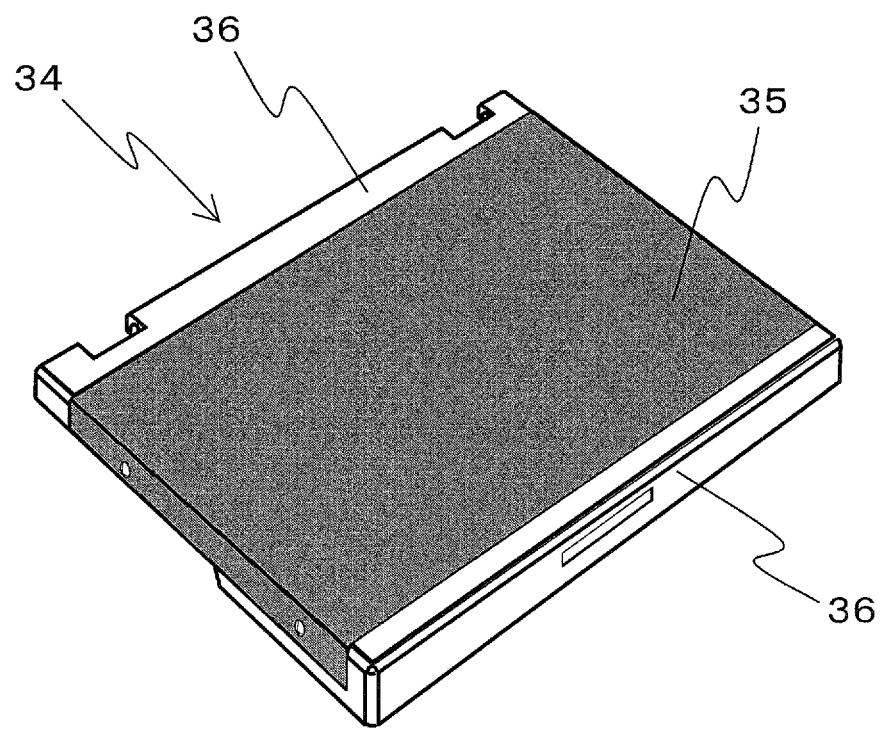
FIG. 8 is a perspective view showing an integrally molded article obtained in Examples and Comparative Examples.

From the sandwich structure of Example 13 (300 mm×300 mm square), a rectangle of 250 mm in length and 160 mm in width was cut out and used as a first member 35. Meanwhile, as a second member 36, the UD prepreg was placed in a hot-plate heating-type preheater maintained at 180° C. and preheated for 1 minute under a pressure of 0.1 MPa. Then, the first member was placed in a press molding die preheated to 120° C., such that the PP sheet side was arranged to be the upper surface. After disposing the preheated UD prepreg thereon, the die was closed and maintained for 120 seconds with a pressure of 15 MPa being applied thereto, thereby obtaining such an integrally molded article 34 as shown in FIG. 8 in which the second member was bonded by press molding. The properties of the thus obtained integrally molded article are shown in Table 6.

Example 29

The integrally molded article 34 shown in FIG. 8 was obtained in the same manner as in Example 28, except that the sandwich structure of Example 22 was used as the first member; the GMT was used as the second member; and the GMT was placed and preheated for 1 minute under a pressure of 0.1 MPa in a hot-plate heating-type preheater maintained at 200° C. The properties of the thus obtained integrally molded article are shown in Table 6.

Example 30

The integrally molded article 34 shown in FIG. 8 was obtained in the same manner as in Example 28, except that the sandwich structure of Example 23 was used as the first member and the UD prepreg was used as the second member. The properties of the thus obtained integrally molded article are shown in Table 6.

TABLE 1

|  |  | PP sheet | PA6 sheet | PA66 sheet | PC sheet | PPS sheet | PPE sheet |
| --- | --- | --- | --- | --- | --- | --- | --- |
| Type |  | — | polypropylene | nylon 6 | nylon 66 | polycarbonate | polyphenylene sulfide | modified polyphenylene ether |
| Sheet basis weight | g/m$^2$ | 100 | 124 | 126 | 132 | 67 | 100 |
| Melting point | ° C. | 165 | 225 | 265 | — | 280 | — |
| Softening point | ° C. | — | — | — | 150 | — | 138 |
| Decomposition initiation temperature | ° C. | 298 | 338 | 375 | 424 | 463 | 300 |
| Usable lower limit temperature (TA1, TB1) | ° C. | 165 | 225 | 265 | 250 | 280 | 230 |
| Usable upper limit temperature (TA2, TB2) | ° C. | 248 | 288 | 325 | 374 | 413 | 300 |

TABLE 2

|  |  | 5-mm mat | 3-mm mat | 6-mm mat | 12-mm mat | 25-mm mat | UD substrate | Woven fabric substrate |
|---|---|---|---|---|---|---|---|---|
| Mode of fiber-reinforced mat | — | dry web | wet web | wet web | wet web | chopped strand mat | continuous fibers | continuous fibers |
| Dispersed state of reinforcement fibers | — | nonwoven fabric nearly monofilament | nonwoven fabric monofilament | nonwoven fabric monofilament | nonwoven fabric monofilament | nonwoven fabric strand (12,000 bundles) | not nonwoven fabric strand | not nonwoven fabric strand |
| Fiber type | — | CF | CF | CF | CF | CF | CF | CF |
| Fiber length (Ln) | mm | 5 | 3 | 6 | 12 | 25 | continuous fibers | continuous fibers |
| Basis weight of fiber-reinforced mat | g/m$^2$ | 100 | 100 | 100 | 100 | 200 | 115 | 200 |
| Ratio of reinforcement fiber (Vf) | % by volume | 11 | 8.0 | 8.7 | 6.8 | 32 | 44 | 42 |
| Weight ratio of fine-denier strand | % by weight | 62 | 100 | 100 | 100 | 3 | 0 | 0 |
| Fiber dispersion rate | % | — | 97 | 93 | 85 | — | — | — |
| Two-dimensional orientation angle | ° | — | 44 | 40 | 36 | — | — | — |

TABLE 3-1

|  |  |  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| Layer for forming skin | Fiber-reinforced mat | — | 5-mm mat | 6-mm mat | 6-mm mat | 6-mm mat | 6-mm mat | 6-mm mat | 3-mm mat | 12-mm mat | 25-mm mat | UD substrate | woven fabric substrate |
|  | Thermoplastic resin (A) | — | PA6 sheet | PA6 sheet | PA66 sheet | PPS sheet | PPS sheet | PPE sheet | PA6 sheet | PA6 sheet | PA6 sheet | PA6 sheet | PA6 sheet |
| Layer for forming core | Fiber-reinforced mat | — | 5-mm mat | 6-mm mat | 6-mm mat | 6-mm mat | 6-mm mat | 6-mm mat | 3-mm mat | 12-mm mat | 25-mm mat | 5-mm mat | 5-mm mat |
|  | Thermoplastic resin (B) | — | PP sheet | PP sheet | PA6 sheet | PA66 sheet | PC sheet | PP sheet | PP sheet | PP sheet | PP sheet | PP sheet | PP sheet |
| Fiber volume content (Vf) | % by volume |  | 20 | 20 | 20 | 20 | 20 | 20 | 20 | 20 | 20 | 45 | 50 |
| Penetration of reinforcement fibers in interface layers between layers for forming skin and layer for forming core | presence/absence |  | present | present | present | present | present | present | present | present | absent | absent | absent |
| Anti-plane angle (θz) |  |  | 5.0 | 6.4 | 6.4 | 6.4 | 6.4 | 6.4 | 5.6 | 8.0 | not measurable | 0.8 | 1.7 |
| Maximum height (Ry) | μm |  | 91 | 131 | 150 | 145 | 149 | 163 | 150 | 145 | 131 | 131 | 131 |
| Average roughness (Rz) | μm |  | 54 | 79 | 91 | 80 | 89 | 95 | 91 | 80 | 20 | 40 | 60 |
| Fracture mode after shearing test | — |  | cohesion fracture | cohesion fracture | cohesion fracture | cohesion fracture | cohesion fracture | cohesion fracture | cohesion fracture | cohesion fracture | fracture of layer for forming core | cohesion fracture | cohesion fracture |

TABLE 3-2

|  |  |  | Comparative Example 1 | Comparative Example 2 | Comparative Example 3 | Comparative Example 4 |
|---|---|---|---|---|---|---|
| Layer for forming skin | Fiber-reinforced mat | — | 5-mm mat | 6-mm mat | 6-mm mat | 6-mm mat |
|  | Thermoplastic resin (A) | — | PP sheet | PP sheet | PA66 sheet | PP sheet |

TABLE 3-2-continued

|  |  |  | Comparative Example 1 | Comparative Example 2 | Comparative Example 3 | Comparative Example 4 |
|---|---|---|---|---|---|---|
| Layer for forming core | Fiber-reinforced mat |  | — | 5-mm mat | 6-mm mat | 6-mm mat | 6-mm mat |
|  | Thermoplastic resin (B) |  | — | PP sheet | PP sheet | PA66 sheet | PA6 sheet |
| Fiber volume content (Vf) |  | % by volume | 20 | 20 | 20 | 20 |
| Penetration of reinforcement fibers in interface layers between layers for forming skin and layer for forming core |  | presence/ absence | absent | absent | absent | absent |
| Anti-plane angle (θz) |  |  | 40.0 | 42.0 | 36.0 | not measurable |
| Maximum height (Ry) |  | μm | not measurable | not measurable | not measurable | 21 |
| Average roughness (Rz) |  | μm | not measurable | not measurable | Not measurable | 15 |
| Fracture mode after shearing test |  |  | — | fracture of a whole | fracture of a whole | fracture of a whole | interface layer destruction |

TABLE 4-1

|  |  |  | Example 12 | Example 13 | Example 14 | Example 15 | Example 16 | Example 17 | Example 18 | Example 19 | Example 20 | Example 21 | Example 22 | Example 23 |
|---|---|---|---|---|---|---|---|---|---|---|---|---|---|---|
| Layer for forming skin | Fiber-reinforced mat | — | 5-mm mat | 6-mm mat | 6-mm mat | 6-mm mat | 6-mm mat | 6-mm mat | 3-mm mat | 12-mm mat | 6-mm mat | 6-mm mat | UD substrate | woven fabric substrate |
|  | Thermoplastic resin (A) | — | PA6 sheet | PA6 sheet | PA66 sheet | PPS sheet | PPS sheet | PPE sheet | PA6 sheet | PA6 sheet | PA6 sheet | PA6 sheet | PA6 sheet | PA6 sheet |
| Layer for forming core | Fiber-reinforced mat | — | 5-mm mat | 6-mm mat | 6-mm mat | 6-mm mat | 6-mm mat | 6-mm mat | 3-mm mat | 12-mm mat | 6-mm mat | 6-mm mat | 5-mm mat | 5-mm mat |
|  | Thermoplastic resin (B) | — | PP sheet | PP sheet | PA6 sheet | PA66 sheet | PC sheet | PP sheet | PP sheet | PP sheet | PP sheet | PP sheet | PP sheet | PP sheet |
| Fiber volume content (Vf) |  | % by volume | 20 | 20 | 20 | 20 | 20 | 20 | 20 | 20 | 20 | 20 | 20 | 20 |
| Penetration of reinforcement fibers in interface layers between layers for forming skin and layer for forming core |  | presence/ absence | present | present | present | present | present | present | present | present | present | present | present | present |
| Foaming ratio of layer for forming core |  | fold | 3 | 3 | 3 | 3 | 3 | 3 | 3 | 3 | 1.5 | 10 | 3 | 3 |
| Properties of Sandwich structure | Anti-plane angle (θz) |  | 5.0 | 6.4 | 6.4 | 6.4 | 6.4 | 6.4 | 5.6 | 8.0 | 6.4 | 6.4 | 0.8 | 1.7 |
|  | Maximum height (Ry) | μm | 91 | 131 | 150 | 145 | 149 | 163 | 150 | 145 | 131 | 131 | 131 | 131 |
|  | Average roughness (Rz) | μm | 54 | 79 | 91 | 80 | 89 | 95 | 91 | 80 | 79 | 79 | 40 | 60 |
|  | Fracture mode after shearing test | — | fracture of core layer | fracture of core layer | fracture of core layer | fracture of core layer | fracture of core layer | fracture of core layer | fracture of core layer | fracture of core layer | fracture of core layer | fracture of core layer | fracture of core layer | fracture of core layer |

TABLE 4-2

|  |  |  | Comparative Example 5 | Comparative Example 6 | Comparative Example 7 | Comparative Example 8 | Comparative Example 9 |
|---|---|---|---|---|---|---|---|
| Layer for forming skin | Fiber-reinforced mat | — | 5-mm mat | 6-mm mat | 6-mm mat | 6-mm mat | 25-mm mat |
|  | Thermoplastic resin (A) | — | PP sheet | PP sheet | PA66 sheet | PP sheet | PA6 sheet |
| Layer for forming core | Fiber-reinforced mat | — | 5-mm mat | 6-mm mat | 6-mm mat | 6-mm mat | 25-mm mat |
|  | Thermoplastic resin (B) | — | PP sheet | PP sheet | PA66 sheet | PA6 sheet | PP sheet |
| Fiber volume content (Vf) |  | % by volume | 20 | 20 | 20 | 20 | 20 |
| Penetration of reinforcement fibers in interface layers between layers for forming skin and layer for forming core |  | presence/ absence | absent | absent | absent | absent | absent |
| Foaming ratio of layer for forming core |  | fold | not measurable | not measurable | not measurable | not measurable | 1.2 |
| Properties of Sandwich structure | Anti-plane angle (θz) |  | 40.0 | 42.0 | 36.0 | not measurable | not measurable |
|  | Maximum height (Ry) | μm | not measurable | not measurable | not measurable | 21 | 131 |
|  | Average roughness (Rz) | μm | not measurable | not measurable | not measurable | 15 | 20 |
|  | Fracture mode after shearing test | — | fracture of a whole | fracture of a whole | fracture of a whole | fracture of skin layer | fracture of a whole |

TABLE 5

|  |  | Example 24 | Example 25 | Example 26 | Example 27 | Comparative Example 10 | Comparative Example 11 | Comparative Example 12 |
|---|---|---|---|---|---|---|---|---|
| First member | — | Example 13 | Example 19 | Example 22 | Example 23 | Comparative Example 6 | Comparative Example 8 | Comparative Example 9 |
| Second member | — | PA compound | PA compound | PA compound | PA compound | PA compound | PA compound | PA compound |
| Integration means | — | insert injection | insert injection | insert injection | insert injection | insert injection | insert injection | insert injection |
| Cylinder temperature | °C. | 280 | 280 | 280 | 280 | 280 | 280 | 280 |
| Shear strength (τ2) | MPa | 19 | 18 | 18 | 19 | delaminated | Shape formation was not possible | Shape formation was not possible |

TABLE 6

|  |  | Example 28 | Example 29 | Example 30 |
|---|---|---|---|---|
| First member |  | Example 13 | Example 22 | Example 23 |
| Second member | — | UD prepreg | GMT | UD prepreg |
| Integration means | — | stamping molding | stamping molding | stamping molding |
| Substrate temperature | °C. | 180 | 200 | 180 |
| Shear strength (τ2) | MPa | 18 | 18 | 18 |
| Shaping | possible/impossible | possible | possible | possible |

In all of Examples 1 to 8, because of the use of the respective fiber-reinforced mats in which the fibers were randomly dispersed in a monofilament form, not only the voids facilitated complex impregnation of the different types of thermoplastic resins but also the difference between the melting point of the thermoplastic resin (A) used for the layers for forming a skin and that of the thermoplastic resin (B) used for the layer forming a core was appropriate so that sandwich laminates in which unevenness in the interface layers was grown to sufficient levels of maximum height Ry and average roughness Rz were obtained. In addition, as a result of observing a cross-section of each sandwich laminate, penetration of single filaments originated from the respective fiber-reinforced mat was observed in the interface layers between the layers for forming a skin and the layer for forming a core. Moreover, the fracture mode after the shearing test showed cohesion fracture and sufficient bonding strength was observed. Therefore, these properties were shown to be appropriate. Especially, in Examples 2 to 8 where the 3-mm mat, 6-mm mat or 12-mm mat was used, particularly ideal interface layers were formed and the reinforcement fibers exhibited a preferable mode of anti-plane angle θz. In Examples 9 to 11, sandwich laminates in which unevenness in the interface layers was grown to a sufficient level of maximum height Ry were obtained. However, it cannot be said that the average roughness Rz was in a satisfactory state. Because of this, as the fracture mode after the shearing test, the layer forming a core showed partial fracture. However, since the delamination thereof from the layers for forming a skin did not occur, the bonding state was satisfactory. Still, it was observed that the bonding state was not uniform in these sandwich laminates. Meanwhile, in Comparative Examples 1 to 3, since the same thermoplastic resin was used for both the layers forming a skin and the layer forming a core, the mode of a sandwich laminate could not be realized. In addition, in Comparative Example 4, since the thermoplastic resin (B) used for the layer forming a core had a higher usable temperature than the thermoplastic resin (A) used for the layers forming a skin, it was difficult to control the maximum height Ry and the average roughness Rz. Because of this, when the fracture mode after the shearing test was observed, we found that fracture occurred in the bonded interface layers between the layers forming a skin and the layer forming a core and that the bonding state was not satisfactory.

Further, in Examples 12 to 21, the bonding state of the interface layers between the layers forming a skin and the layer forming a core was observed to have the same characteristics as in Examples 1 to 8. Therefore, we found that the skin layers and the core layer were strongly bonded with each other and this effect was also seen in Examples 20 and 21 where the expansion ratio was changed. Still further, in Examples 22 and 23, because of the use of the continuous reinforcement fibers in the skin layers, sandwich structures having excellent rigid feel in addition to the above-described characteristics of Examples 12 to 21 were obtained. Moreover, in Examples 24 to 27 where insert molding was performed and Examples 28 to 30 where press molding was performed, as compared to Comparative Example 12 where a structure having hardly any voids was used as in Comparative Example 9, integrally molded articles that had voids and thus showed sufficient lightweightness were obtained. This is because the fine voids originated from the continuous foamed structure of the respective sandwich structures were impregnated with the thermoplastic resin originated from the second member at the interface with the second member, and this yielded strongly bonded integrally molded articles. Furthermore, in Examples 29 and 30, since the continuous reinforcement fibers were used for the skin layers, integrally molded articles having excellent rigid feel were obtained.

On the other hand, in the sandwich structures in which the same thermoplastic resins were used as in Comparative Examples 5 to 7, foaming of only the layer forming a core could not be realized and it was thus difficult to control the expansion ratio. Further, in Comparative Examples 10 to 12 where the structures of Comparative Examples 6, 8 and 9 were used, respectively, the bondability with the second member was poor and the resulting molded articles had poor outer appearance, with many concave and convex portions originated from foamed structure being formed on the surface. Particularly, in Comparative Example 10, an integrally molded article was barely obtained. However, the bonded parts were detached by a small load and the integrally molded article was far from the level of practical use. Moreover, as in Comparative Example 8, in the structure in which the thermoplastic resin used for the skin layers had a lower melting point than the thermoplastic resin used for the core layer, since the usable temperature was below TB1, the thermoplastic resin (B) was not sufficiently melted and the irregularities in the interface layers could not be formed with satisfactory maximum height Ry and average roughness Rz so that nothing but a structure having unsatisfactory bonding state was obtained.

INDUSTRIAL APPLICABILITY

A strong bond is formed at the interfaces between layers forming a skin and a layer forming a core that comprise different resins as well as between skin layers and a core layer that comprise different resins. Therefore, a sandwich laminate and a sandwich structure can be obtained without any particular restriction on the combination of the thermoplastic resins to be used therein. Further, by bonding them with other member(s), an integrally molded article can be easily molded. Accordingly, the sandwich structure and integrally molded article can be suitably used in a wide range of applications, including automobile interiors and exteriors, electric/electronic device casings, structural materials of bicycles and sporting goods, aircraft interior materials, transport boxes and the like.

The invention claimed is:

1. A sandwich laminate comprising:
   as layers forming a skin and a layer forming a core, sheet-form intermediate substrates each comprising a mat composed of reinforcement fibers impregnated with a thermoplastic resin,
   wherein
   at least said sheet-form intermediate substrate used as said layer forming a core has a thermal expansibility,
   the usable temperature region of a thermoplastic resin (A) constituting said layers forming a skin and that of a thermoplastic resin (B) constituting said layer forming a core overlap each other over a temperature range of at least 5° C.,
   said thermoplastic resin (A) has a temperature region where it does not melt at a lower limit of said usable temperature region of said thermoplastic resin (B);
   said reinforcement fibers contained in said mat penetrate through interface layers formed by said thermoplastic resin (A) constituting said layers forming a skin and said thermoplastic resin (B) constituting said layer forming a core, and
   said thermoplastic resin (A) constituting said layers forming a skin and said thermoplastic resin (B) constituting said layer forming a core form interface layers each with a concave-convex shape having a maximum height Ry of not less than 50 µm and an average roughness Rz of not less than 30 µm.

2. The sandwich laminate according to claim 1, wherein, in said mat, the reinforcement fibers are discontinuous reinforcement fibers that are dispersed in a nearly monofilament form.

3. The sandwich laminate according to claim 1, wherein, in said mat, the reinforcement fibers are discontinuous reinforcement fibers that are randomly dispersed in a monofilament form.

4. The sandwich laminate according to claim 1, wherein said reinforcement fibers in said interface layers have an anti-plane angle θz of 5° or larger.

5. The sandwich laminate according to claim 1, wherein said reinforcement fibers constituting said mat are carbon fibers.

6. The sandwich laminate according to claim 1, wherein said thermoplastic resins (A) and (B) are a combination of resins selected from the group consisting of polyolefin-based resins, polyamide-based resins, polyester-based resins, polycarbonate-based resins, polystyrene-based resins, PPS-based resins, polyether ketone-based resins and modified polyphenylene ether-based resins.

7. A method of producing a sandwich structure, said method comprising heating the sandwich laminate according to claim 1 to allow said layer forming a core to expand at a prescribed expansion ratio.

8. The method according to claim 7, wherein said expansion ratio is 1.5 to 10-fold.

* * * * *